(12) United States Patent
Maone et al.

(10) Patent No.: US 7,856,338 B2
(45) Date of Patent: Dec. 21, 2010

(54) APPARATUS AND METHOD FOR DETECTING A REVERSION OF DIRECTION OF A RELATIVE MOVEMENT

(75) Inventors: Francesco Alex Maone, Zurich (CH); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 329 days.

(21) Appl. No.: 12/016,855

(22) Filed: Jan. 18, 2008

(65) Prior Publication Data

US 2008/0177499 A1    Jul. 24, 2008

(30) Foreign Application Priority Data

Jan. 18, 2007    (DE) .................... 10 2007 002 705

(51) Int. Cl.
*G06F 19/00*    (2006.01)
(52) U.S. Cl. ................. 702/147; 702/142; 702/145; 702/148; 702/149
(58) Field of Classification Search ............. 702/147, 702/142, 145, 148, 149
See application file for complete search history.

(56) References Cited

U.S. PATENT DOCUMENTS

| 3,789,197 | A |   | 1/1974 | Games |
| 3,815,111 | A |   | 6/1974 | Abbe |
| 4,043,418 | A | * | 8/1977 | Blakeslee .................... 180/168 |
| 4,814,701 | A |   | 3/1989 | Wallrafen |
| 5,764,095 | A | * | 6/1998 | Carobolante ................. 327/345 |
| 5,796,231 | A | * | 8/1998 | Kyodo ......................... 318/608 |
| 6,222,362 | B1 |   | 4/2001 | Schulter et al. |
| 6,870,365 | B1 |   | 3/2005 | Yokotani et al. |
| 2003/0205998 | A1 |   | 11/2003 | Heremans et al. |
| 2004/0093181 | A1 | * | 5/2004 | Lee ............................ 702/150 |
| 2005/0258820 | A1 | * | 11/2005 | Forster ....................... 324/165 |
| 2008/0186019 | A1 | * | 8/2008 | Hinz ...................... 324/207.21 |

FOREIGN PATENT DOCUMENTS

| DE |          36 19 710 A1 | 11/1986 |
| DE |       197 33 581 C 1 | 10/1998 |
| DE |       199 37 964 A 1 |  2/2001 |
| DE |   10 2004 017 191 A1 | 10/2005 |
| EP |         0 269 779 A1 |  6/1988 |

* cited by examiner

*Primary Examiner*—Sujoy K Kundu
*Assistant Examiner*—Hyun Park
(74) *Attorney, Agent, or Firm*—Slater & Matsil, L.L.P.

(57) ABSTRACT

An apparatus for detecting a reversion of direction of a relative movement between a periodic scale for defining a periodic field and a field sensor. The field sensor outputs first and second sensor signals. The first sensor signal is advanced from the second sensor signal if the periodic field moves in a first direction. The second sensor signal is advanced from the first sensor signal if the periodic field moves in a second direction. A determiner determines the difference between the first sensor signal and a signal corresponding to a temporal change of the second sensor signal or between the second sensor signal and a signal corresponding to a temporal change of the first sensor signal.

31 Claims, 12 Drawing Sheets

US 7,856,338 B2

APPARATUS AND METHOD FOR DETECTING A REVERSION OF DIRECTION OF A RELATIVE MOVEMENT

This application claims priority from German Patent Application No. 10 2007 002 705.4, which was filed on Jan. 18, 2007, and is incorporated herein by reference in its entirety.

TECHNICAL FIELD

Embodiments of the present invention relate to an apparatus and a method for detecting a reversion of direction of a relative movement between a periodic scale and a field-sensor means, such as upon determination or prediction of a reversion of direction by means of magnetoresistive sensors.

BACKGROUND

In numerous applications, apart from a rotational-speed or speed measurement of a periodic scale or an indicator object, also recognition of the direction of movement and/or change of the direction of movement, such as the rotational direction of a wheel or a shaft, often is used. To this end, magnetoresistive sensors for determining the rotational speed and the rotational direction generally are used.

Magnetoresistive sensors are based on the magnetoresistive effect and may, for example, comprise a layer sequence, the electrical resistance of which between two contacts, depends on a relative angle between an impressed magnetic field and an external sensor magnetic field, with the impressed magnetic field being fixed for a given magnetoresistive (MR) sensor. With the aid of the change in resistance, the relative location of the impressed magnetic field with respect to the external sensor magnetic field, and particularly the relative location between the indicator object (for the sensor magnetic field) and the field-sensor means may thus be determined. Magnetoresistive sensors are often based on the GMR (giant magnetic resistance) effect, and the corresponding sensors are referred to as GMR sensors.

In magnetoresistive sensors in, e.g., a speed, angle, direction-measuring device, the necessary signal processing is performed by a digital signal processor means (DSP), for example. The digital signal processor means takes over functions, such as compensation of adjustment deviations, reduction of the hysteresis, and the like. In the automobile branch, for example, it is necessary to monitor rotational directions of machines with high accuracy and reliability. This may be done by processing the signals in a digital context (i.e., in a low-frequency range). However, there are also areas for which analog processing (so-called pre-processing) of signals or at least real-time or at least prompt change-of-direction recognition would be desirable.

SUMMARY OF THE INVENTION

According to embodiments, the present invention includes an apparatus for detecting a reversion of direction of a relative movement between a periodic scale defining a periodic field and field-sensor means for outputting first and second sensor signals upon the periodic field defined by the periodic scale. In a first direction of movement of the relative movement, the first sensor signal is advanced from the second sensor signal, and, in a second direction of movement of the relative movement, the second sensor signal is advanced from the first sensor signal. The apparatus comprises means for determining a difference between the first sensor signal and a signal corresponding to a temporal change of the second sensor signal, or between the second sensor signal and a signal corresponding to a temporal change of the first sensor signal, and means for detecting the reversion of direction of the relative movement depending on the determined difference.

BRIEF DESCRIPTION OF THE DRAWINGS

Embodiments of the present invention will be explained in greater detail in the following with reference to the accompanying drawings, in which.

Before explaining embodiments of the present invention in greater detail in the following on the basis of the drawings, it is pointed out that the same elements in the figures are provided with the same or similar reference numerals and that repeated description of these elements is omitted.

DETAILED DESCRIPTION OF ILLUSTRATIVE EMBODIMENTS

Figure 1A:
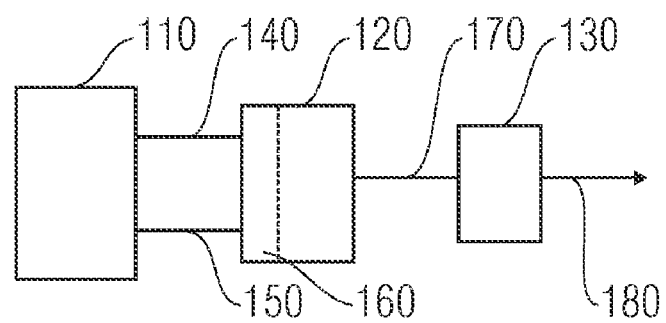
FIG. 1a is a block diagram of a reversion-of-movement sensor according to an embodiment of the present invention.

Before dealing with embodiments of the present invention specifically on the basis of the figures, a few aspects on which the present invention are based will be discussed beforehand.

In the following embodiments, a reversion of direction of a relative movement between a periodic scale and a field-sensor means is determined by the fact that the periodic scale in the field-sensor means generates a first sensor signal and a second sensor signal, which are phase-shifted with respect to each other, and the reversion of direction is determined by detecting a temporal derivation of the first or second sensor signal, such as at discontinuous certain times, such as the zeros in one of the sensor signals. The reversion of direction of the relative movement is in particular determined by the fact that a difference between the derivation of the first sensor signal and the respective other sensor signal is formed. Since the phase shift of the first sensor signal and of the second sensor signal depends on the relative movement direction of the periodic scale in comparison with the field-sensor means, the reversion of direction shows in a sudden change in the above-described difference between the temporal derivation of the first or second sensor signal from the respective other sensor signal.

The periodic scale may be understood as an indicator object, which defines a periodic field, that generates a periodic field or periodically influences a static field, which again is detected in the field-sensor means. Examples for this are magnets or magnetic areas for magnetic field generation periodically applied on a pole wheel and/or a flywheel, with north and south poles of the magnets alternating on the surface of the pole wheel and/or the flywheel. Since the magnetic field lines exit the north poles perpendicularly and again perpendicularly enter the south poles, the magnetic field changes periodically along the periodically applied magnetic poles, which manifests itself in a rotation of the magnetic field at a small distance above the first surface. This rotating magnetic field configuration may, for example, be determined by magnetic-field detectors and used for movement direction determination. Alternatively, protruding and recessed areas may be alternating provided along the circumference for magnetic-field influence on an external magnetic field.

According to subsequently described embodiments, the changing magnetic field is determined, during a relative movement between indicator object and field-sensor means, by the fact that four GMR elements connected to form a bridge detect the variable magnetic field and generate a periodic electric signal therefrom. The magnetic-field directions impressed in the GMR elements here may be impressed such that they are either parallel or anti-parallel to the magnetic-field direction exiting from or entering the north poles and south poles, respectively. The four GMR elements connected to form a bridge here generate the first or the second sensor signal, and the respective other sensor signal is generated by a fifth GMR element, the fixed impressed magnetization direction of which, for example, passes parallel or anti-parallel to the magnetic field directions impressed in the other four GMR elements. The first and second sensor signals, for example, are phase-shifted 90 degrees with respect to each other by the fifth GMR element being separated in space from the four GMR elements connected to form a bridge. The spatial separation, for example, has a value of ¼ of a period of the periodic scale. Thus, either the first sensor signal or the second sensor signal is advanced from the respective other one, from which the movement direction of the exemplary pole wheel or flywheel can be determined.

Periodically attached magnets (or magnetic areas) on the flywheel or pole wheel, as discussed, only represent one example of generating a periodic field of a periodic scale. Other indicator objects for a magnetic field could, for example, be gears, which influence the magnetic field depending on whether a depression or a tooth appears above or below the magnetic-field sensor means. Thus, so-called gears or gear racks in connection with a back-bias magnet may be employed as indicator objects or periodic scales. The back-bias magnet generates a stationary background magnetic field defined or influenced by the gear arrangement, i.e., protruding teeth and recessed depressions (gaps), wherein the distance of the teeth is referred to as so-called "pitch" distance in these so-called back-bias arrangements of gears or gear racks.

In the above-mentioned pole wheels or pole bars, adjacently arranged north and south poles represent a periodic permanently magnetized structure. Near the surface of the pole wheel, the field lines of the magnetic field (in air) pass in a directed manner from the magnetic north pole to the magnetic south pole of the pole wheel structure. The different permanently magnetized areas usually are equally large, wherein in this case the distance of the pole pairs is referred to as so-called "pitch" distance in a pole wheel application.

For determining a reversion of direction, the relative phase of the above-described signals can be detected, and the movement direction, and hence also the reversion of direction, can be determined from the knowledge as to which signal is advanced from the other. The two signals here on the one hand are the so-called bridge signal, which is generated by the GMR elements connected to form a GMR bridge, and on the other hand the so-called center or direction signal, which is generated by the fifth GMR element. The bridge signal also is referred to as $s(x)$, and the direction signal as $d(x)$. The direction signal $d(x)$ may, for example, be sampled at the zeros of the bridge signal $s(x)$, wherein, if the sampling at a falling edge of the bridge signal is greater than the sampling at a rising edge, the maxima of the directional signal $d(x)$ will follow the maxima of the bridge signal $s(x)$, whereby a certain movement direction (for example, from left to right) of the magnetic field signal is fixed. With an equivalent procedure, the direction may also be determined at a rising edge of the bridge signal $s(x)$. This procedure is indeed simple and efficient, since it uses the already-determined zero crossings of the bridge signal, and it is further independent of the signal frequency, since direction is only determined once in half a period and no further processing is necessary, and a remaining offset of the bridge signal $s(x)$ also is automatically compensated by a comparison being performed with the following samples, which have the same offset. A disadvantage consists in the fact that the movement direction can only be determined after a second zero crossing. Thus, in the most unfavorable case, a full period elapses until the direction can be determined. Embodiments described subsequently avoid this disadvantage and rather offer the possibility to determine a reversion of direction immediately or at once.

Further advantages of the subsequent embodiments are, for example, that no analog-digital conversion is necessary for determination or calculation of the direction, and, consequently, significant area savings are possible in a sensor (for example, with respect to the silicon area on a wafer). Furthermore, it is advantageous that the contributions of vibration modes at low frequencies are reduced by an intrinsic frequency-dependent amplification. As already described, embodiments of the present invention are particularly advantageous in that a reversion of direction or change of direction can be determined immediately as it happens (and hence asynchronously with respect to the system clock). This allows for very quick response time, whereby embodiments of the present invention are suited, in particular, for high-speed applications. Furthermore, embodiments of the present invention do not have disadvantageous so-called calibration delays, which typically occur in a completely digital access, in a start-up phase. In particular, this is the case if the signal frequency lies within an advantageous working range and thus has sufficiently high mechanical acceleration.

The subsequent embodiments hence offer a possibility or architecture to determine a change of rotation or movement of the magnetic field indicator (or an input magnetic field), which is used in connection with MR sensors, with short response time (short time-to-output). They comprise a prediction technique based on a mathematical representation of the available signals and implemented by means of a low-frequency differentiator.

FIG. 1a shows a schematic illustration of a reversion-of-movement sensor according to an embodiment of the present invention. The reversion-of-movement sensor comprises a field-sensor means 110, a means 120 or a comparator for determining a difference 170, and a means 130 or a processor for detecting the reversion of direction. The field-sensor means 110 detects a periodic field and, in response thereto, outputs a first sensor signal 140 and a second sensor signal 150. The first sensor signal 140 is advanced from the second sensor signal 150, or the second sensor signal 150 is advanced from the first sensor signal 140, depending on relative movement direction between the arrangement of the field-sensor means on the one hand and the periodic field on the other hand. The first sensor signal 140 and the second sensor signal 150 are input into the means 120 for determining a difference 170, which forms a difference 170 between the first sensor signal 140 and a signal corresponding to a temporal change (derivation) of the second sensor signal, or conversely between the second sensor signal 150 and a signal corresponding to a temporal change of the first sensor signal 140 of a difference 170, such as a derivation. The means 120 for determining a difference 170 thus comprises a means 160, which generates the signal corresponding to a temporal change from the derivation of the signal. The means 120 for determining a difference 170 passes the determined difference 170 on to the means 130 for determining the reversion of direction, where a reversion of direction of the relative movement is signaled and output as result 180 on the basis of the determined difference 170.

Figure 1B:
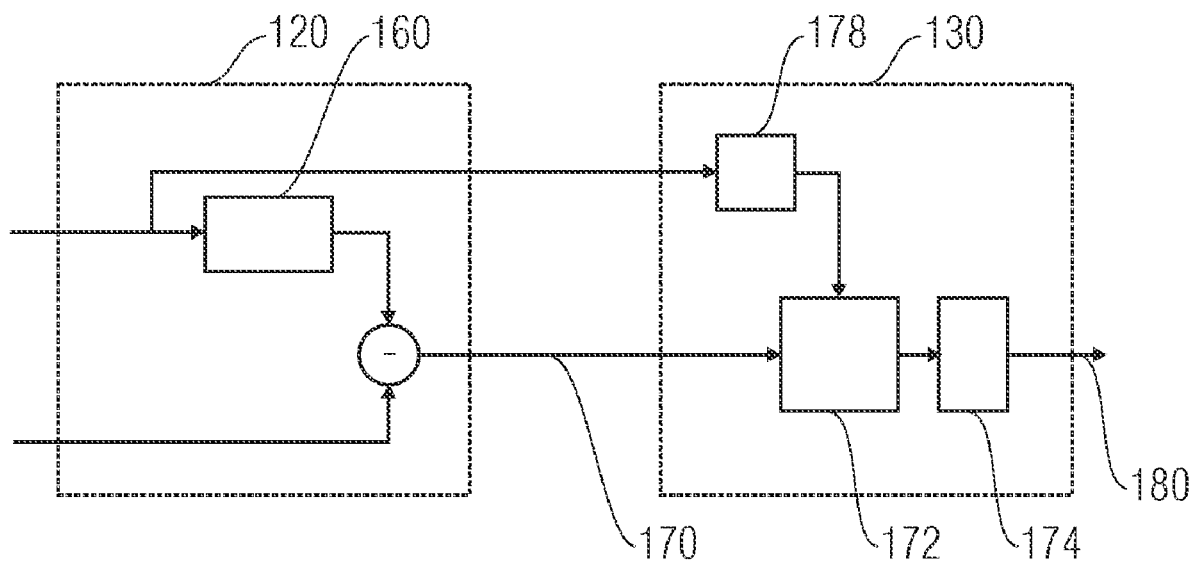
FIG. 1b is a block diagram of a reversion-of-movement sensor according to an embodiment with sampling at zero crossings.
Figure 1C:
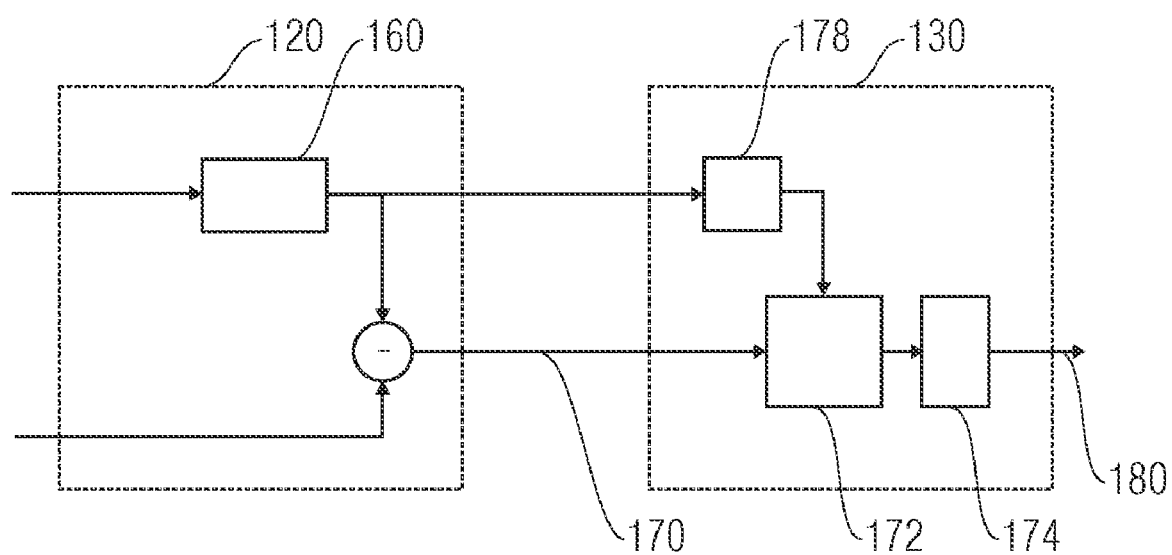
FIG. 1c is a block diagram of a reversion-of-movement sensor according to an embodiment with sampling at extreme points.

FIGS. 1b and 1c show embodiments for a reversion-of-movement sensor in which a sampling of the comparison result and/or the difference signal is performed at discrete times. In the embodiment in FIG. 1b, the sampling takes place at zero crossings, and in the embodiment in FIG. 1c at extreme points of the first or second sensor signal 140, 150. As will become obvious later with reference to signal examples, the sampling facilitates a more easy-to-evaluate difference signal in so far as changes in this signal only arise at changes in direction.

Like in the embodiment in FIG. 1a, the comparator 120 comprises two inputs for the first and second sensor signals 140, 150, a differentiator, and the output for the difference 170.

In the embodiment shown in FIG. 1b, the comparator 120 further comprises a further output coupled to the input of the differentiator 160. The means 130 for detecting comprises a zero crossing detector 178, a sampler 172 and a threshold value comparator 174 outputting the reversion-of-direction signal 180. The zero crossing detector 178 thus detects times at which the input signal of the differentiator 160 has a zero crossing, and outputs a corresponding signal to the sampler 172, which, for example, performs sampling of the determined difference 170 at these times and forwards a result to the threshold value comparator 174. The threshold value comparator 174 determines if a value range of the sampled difference 170 has exceeded or fallen short of a threshold value at the times, and outputs a reversion-of-direction signal 180 signaling a reversion of direction.

In the embodiment shown in FIG. 1c, like in the embodiment described before, a sampling takes place at discrete times, but the sampling here takes place at times at which the output signal of the differentiator 160 has an extreme value. Thus, the comparator 120 in this embodiment comprises a further output for the output signal of the differentiator 160, which couples to an extreme point detector 178. The extreme point detector 178 determines the times at which the output signal of the differentiator 160 has an extreme value, and passes a corresponding signal to the sampler 172, which, for example, samples the difference 170 at these times and in turn forwards the result to the threshold value comparator 174. Like before, the threshold value comparator 174 determines if a value range of the sampled difference 170 has exceeded or fallen short of a threshold value at the times, and outputs a reversion-of-direction signal 180 signaling a reversion of direction.

Figure 2:
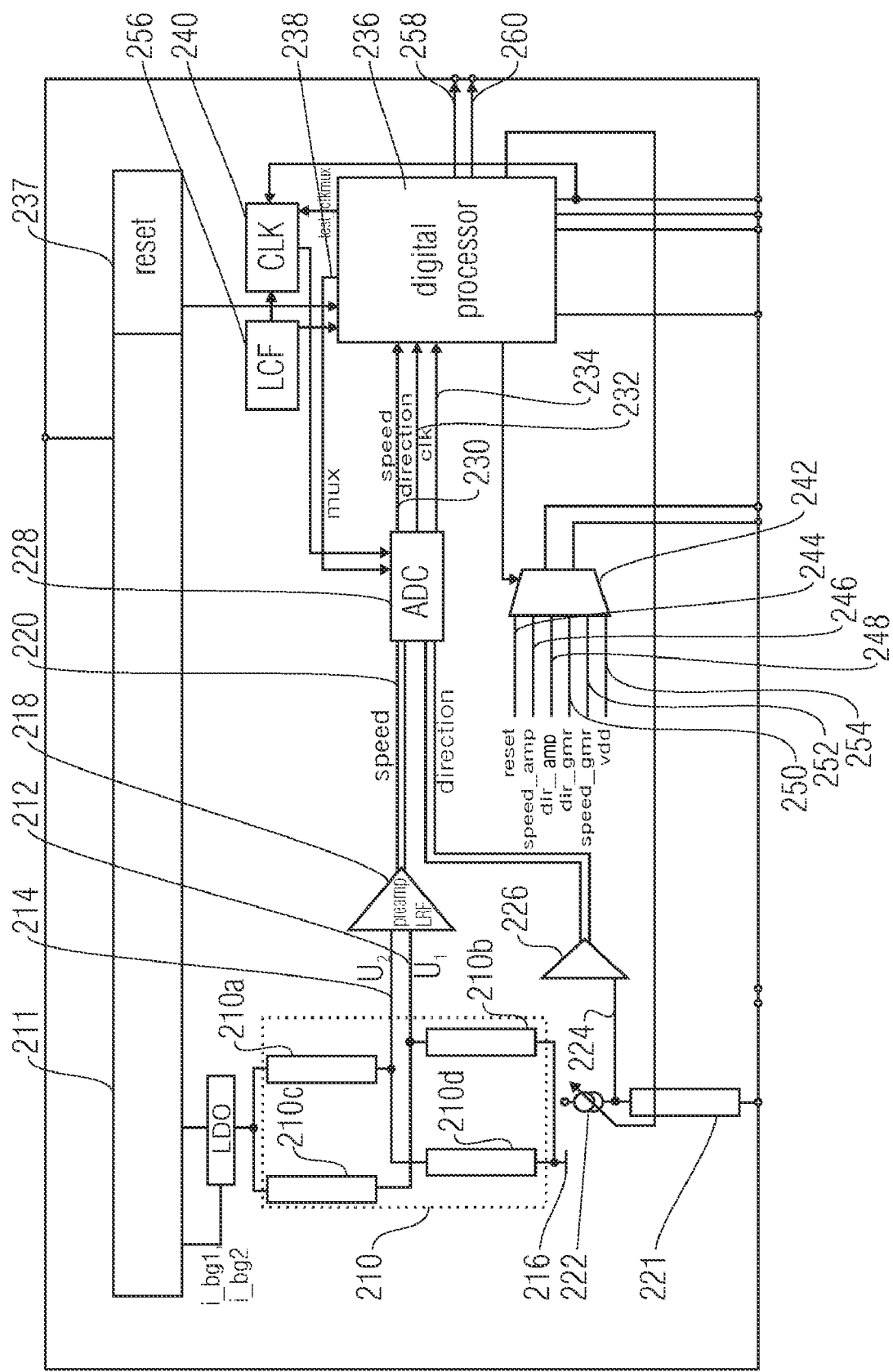
FIG. 2 shows a sensor architecture based on a standard MR sensor.

FIG. 2 shows a possible sensor architecture or arrangement for measuring, for example, rotational angles, rotational speed or rate and direction of rotation, exemplarily based on magnetoresistive sensor elements, and in which subsequently described embodiments for change-of-direction detection can be applied. The magnetoresistive sensor elements may, for example, be GMR elements. In FIG. 2, four GMR elements are connected to form a bridge 210 (GMR bridge or speed GMR bridge). The bridge 210 is supplied with voltage from the supply means 211 via a LDO (low dropout regulator) or buck converter, wherein currents i_bg1 and i_bg2 are predetermined for the LDO so as to impress a predetermined current into the bridge 210. The bridge 210 comprises four GMR elements, with one GMR element 210c connected between the LDO means and a first output 212, one GMR element 210a connected between the LDO means and a second output 214, one GMR element 210b connected between ground 216 and the first output 212, and one GMR element 210d connected between the ground 216 and the second output 214. The voltage $u_1$ is present at the first output 212, and the voltage $u_2$ is present at the second output 214, both being dependent on the resistances of the GMR elements resulting from the external magnetic field. In a preamplifier 218, both voltages are combined, amplified and output as speed signal 220.

A GMR element 221 is connected between the supply means 211 and a current source 222. Between the current source 222 and the GMR element 221, a direction signal 224 is tapped and passed on to a state machine 228 via a buffer having low-pass filter properties, for example. As a further input, the state machine 228 obtains the speed signal 220 from the preamplifier 218. Both the preamplifier 218 and the buffer 226 may comprise low-pass filters. The state machine 228 may comprise a multiplexer analog-digital converter (ADC), and outputs a digital speed signal 230, a digital direction signal 232 and a count impulse 234, which are processed further by a digital processor means 236. The digital processor means 236 is connected to the supply means 211 and is coupled to a resetter 237. The digital processor means 236 outputs a multiplexer signal 238 to the state machine 228 and a signal test_clkmux to a count generator 240. Furthermore, the digital processor means 236 is connected to the current source 222 and/or controls same, and is connected to a test multiplexer 242. The test multiplexer 242, which also is connected to the supply means 211, comprises further terminals for a reset signal 244, a terminal for a speed amplification signal 246 (speed_amp), a terminal for a direction amplification signal 248 (dir_amp), a direction GMR signal 250 (dir_gmr), a speed GMR signal 252 (speed_gmr), and a terminal for the supply voltage 254 (Vdd). The count generator 240 is connected to the state machine 228 and obtains an input from a LCF (lock control function) means 256, wherein the LCF means 256 also sends signals to the digital processor means 236. The count generator 240 is further connected to the supply means 211. The digital processor means 236 comprises a first terminal 258 and a second terminal 260.

The processor means 236 uses the sampled digital speed and direction signal and therefrom derives rotational speed and/or rotational angle, for example, which it outputs at the terminal 258 and 260. It may also deduce the rotational direction from the two signals, as has been described previously. However, this is not absolutely necessary if the embodiments described in the following are implemented in the arrangement according to FIG. 2, as will still be described in the following but is not shown in FIG. 2 for clarity reasons. In particular, the digital processor means 236 could use the reversion-of-direction signal 180, which will be described in greater detail further below, to be informed about reversions of directions early, and not to increment, but to decrement the rotational angle depending on the recognized periods in the signals 230 and/or 232, or vice versa. Thus, according to one embodiment of the present invention, the digital processor means 236 could have a further input for the reversion-of-direction signal 180, to detect reversions of direction and infer a new, reversed direction of movement from a current rotational direction.

FIG. 2 shows the elements of the magnetoresistive sensor (MR sensor) as connected in a Wheatstone-like bridge, which outputs two signals, one signal of the voltage $u_1$ and a second signal of the voltage $u_2$, which physically are of opposite phase due to the chosen arrangement of the GMR elements, as will still be discussed further in the following. According to an embodiment, the MR bridge 210 is arranged on two sides or near two opposite edges of an integrated circuit, wherein, to achieve high sensitivity, each resistor and/or each GMR element is arranged such that the differential voltage output 220 is maximized.

Figure 3A:
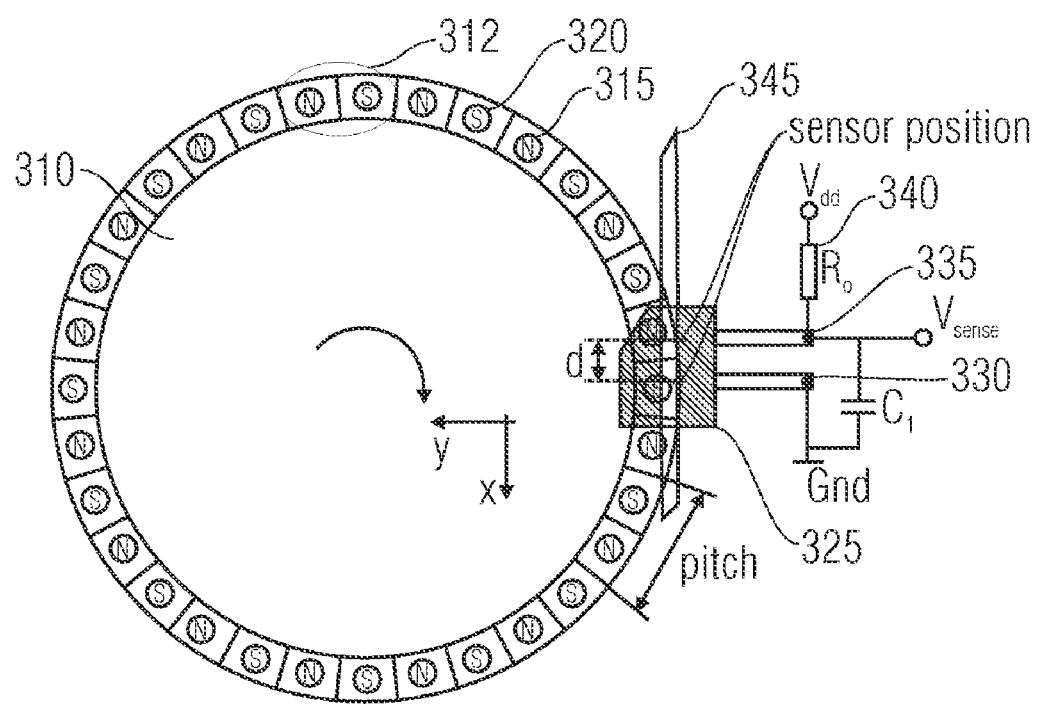
FIG. 3a is a top view onto a typical application of a magnetoresistive sensor for the determination of a rotation.
Figure 3B:
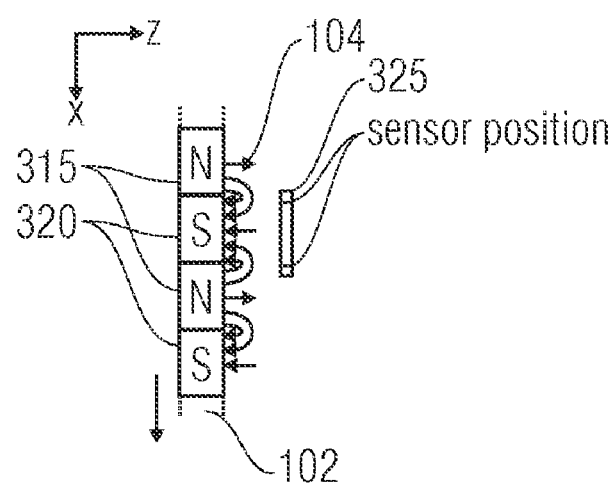
FIG. 3b is a cross-sectional view of the embodiments of FIG. 3a for illustration of the field line course.

FIGS. 3a and 3b show a pole wheel 310, which is arranged in parallel to an X,Y plane and which serves as an indicator object for the sensor arrangement of FIG. 2. The pole wheel 310 has permanently magnetized regions in an edge region 312, with north pole areas 315 and south pole areas 320 alternating periodically. A magnetic field sensor means 325 comprises GMR sensors at a distance d, a first terminal 330 connected to ground Gnd, and a second terminal 335 connected to the positive supply voltage Vdd via a resistor 340. A sensor voltage $V_{sense}$, which builds up via a capacitance $C_1$ against the ground Gnd, subsequently is processed further and is to represent the signal $u_1$ or $u_2$ from FIG. 2, for example. A region each including a north pole area 315 and a south pole area 320 is referred to as a pitch or period, whereas the extension along the circumference of the wheel 310 is referred to as a pitch or period length. In the present embodiment, the pole wheel 310 rotates in clockwise direction in the chosen view, and the second terminal 335 is a terminal for the positive supply voltage Vdd of the magnetic field sensor means 325.

FIG. 3b shows a cross-sectional view along a cross-section 345 of the pole wheel 310 from FIG. 3A. The cross-sectional view from FIG. 3b is parallel to a X,Z plane, i.e., the Y direction is perpendicular to the drawing plane. Two south pole areas 320 and two north pole areas 315, which alternate, are shown. Here, the magnetic field lines exit the north pole areas 315 and are directed to the south pole areas 320. The magnetic field sensor means 325 detects the magnetic field 104 by the GMR sensors, which are attached at sensor positions. If the pole wheel 310 now, for example, moves in clockwise direction in FIG. 3a, the periodically arranged north pole areas 315 and south pole areas 320, which form a periodic scale 102 with a period, move from the top downward, whereas the magnetic field sensor means 325 remains fixed. During this movement, the magnetic field sensor means 325 detects a rotating magnetic field 104, with the magnetic field 104 rotating in anti-clockwise direction, namely such that the magnetic field 104 rotates from one north pole area 315 to an ensuing north pole area 315 around 360°. During this movement, a periodic sensor signal is generated in the MR sensors. The arrangement of the field sensor arrangement 325 is such that it is sensitive with respect to the magnetic field components and/or a change of the magnetic field components in the X,Z plane.

In further embodiments, the pole wheel 310 and/or the periodic scale 102 is not rotating, but the magnetic field sensor means 325 and/or both the magnetic field sensor means 325 and the periodic scale 102 move relatively with respect to each other. For the detection of periodic signals, only relative movement of the periodic scale 102 with respect to the magnetic field sensor means 325 is necessary. Likewise, the periodic scale 102 does not have to be realized in form of a pole wheel 310, but may also comprise a straight shape in the form of a bar or beam, so that back-and-forth movement of the corresponding bar can be determined.

A change in the corresponding sensor voltage $V_{sense}$ here happens as a result of the magnetoresistive effect, which causes a change in resistance, for example, of the GMR elements, namely such that the resistance changes as compared with the impressed magnetic field of the GMR elements upon a change in the magnetic field 104. The relation describing the magnetoresistive effect can be expressed mathematically by the following formula:

$$R(x)=R_O+S \cdot B(x) \quad (1)$$

wherein S represents the magnetoresistive sensitivity, and $R_O$ represents a resistance valid for $|B(x)|=0$ (infinitesimal magnetic field 104).

FIGS. 3a and 3b thus show the fundamentals for a sensor having the task of detecting a reversion of direction. A magnetized pole wheel 310 here is used to generate a magnetic field $B(x)$, and the magnetic field sensor means 325 here is sensitive to the generated magnetic field 104 and/or to a certain component. Output signals of the magnetic field sensor means 325 are both the speed and the direction of the magnetic field 104 $B(x)$ (and hence the pole wheel rotational direction). So as to be able to determine the rotational direction, however, a third magnetoresistive sensor element is necessary, which may be placed at the center of the magnetic field sensor arrangement 325, and the corresponding arrangement will be dealt with in greater detail in the following.

Figure 4A:
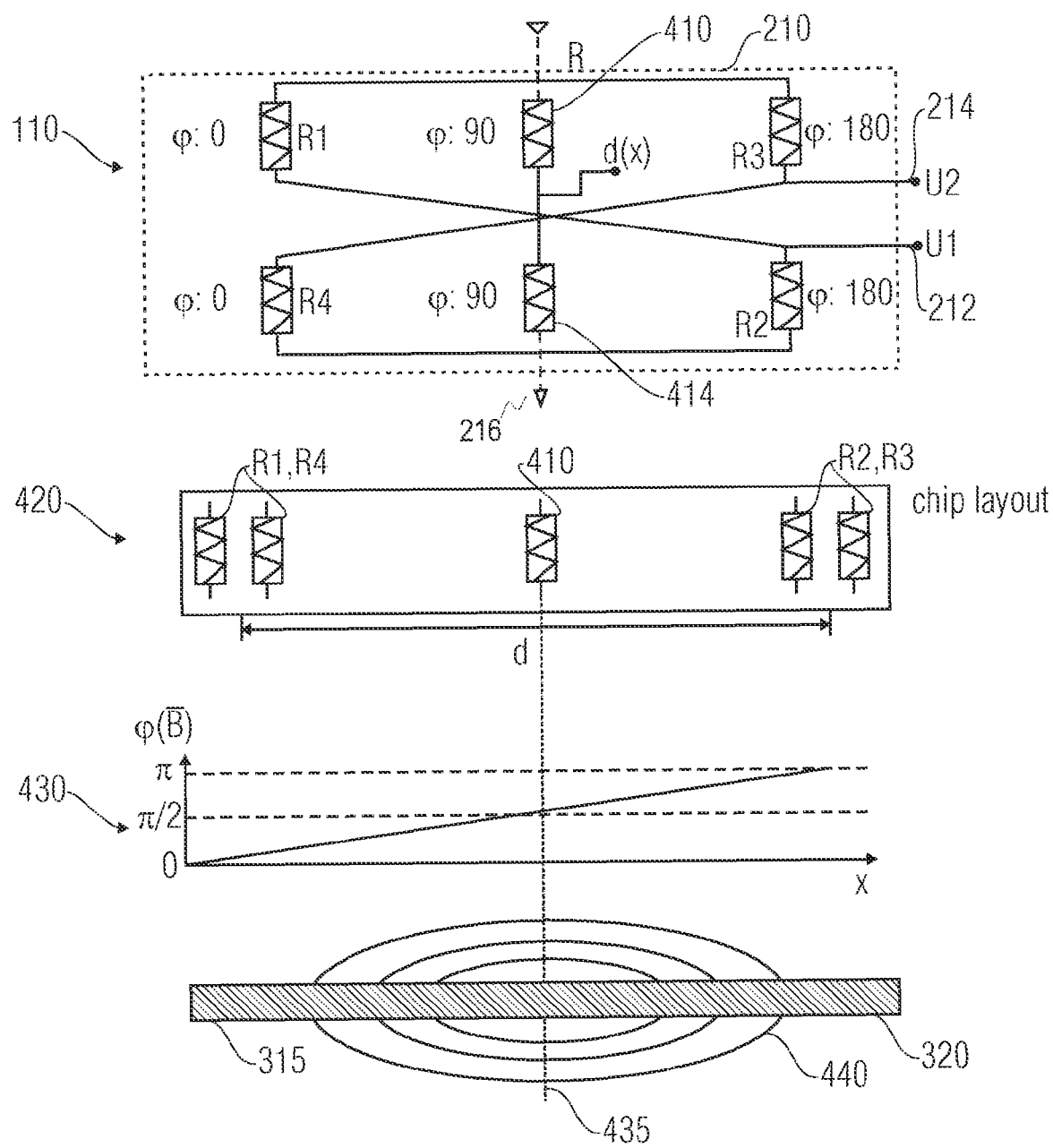
FIG. 4a is an illustration of a magnetoresistive bridge and a positioning of the magnetoresistive sensor element as compared with the magnetic field.

FIG. 4a shows a schematic illustration for an arrangement of GMR elements and a corresponding phase course of the magnetic field 104. A field-sensor means 110, which may, for example, be the magnetic field sensor means 325 of the embodiment of FIG. 3, comprises four sensor elements, a first sensor element R1, a second sensor element R2, a third sensor element R3 and a fourth sensor element R4, which are connected to form a bridge 210. This means that the first sensor element R1 is connected between a supply voltage and a first output 212, and the third sensor element R3 is connected between the supply voltage $V_R$ and the second output 214, the second sensor element R2 is connected between the ground 216 and the first output 212, and the fourth sensor element R4 is connected between the ground 216 and the second output 214. Additionally, the field-sensor means 110 comprises a fifth sensor element 410 and a sixth sensor element 414. All sensor elements here are GMR elements, for example. The fifth sensor element and the sixth sensor element are connected in series between the ground 216 and a further supply voltage (not shown in FIG. 4*a*), and the signal d(x) is tapped between the fifth sensor element and the sixth sensor element. The distance of the first and fourth sensor elements R1 and R4 on the one hand and of the second and third sensor elements R2 and R3 on the other hand is chosen here such that the distance includes ¼ of a period of the periodic scale 102. More generally, the distance may set to be (4n−3)/(4n) of the period, with n being a natural number.

In order to achieve as high as possible sensitivity of the field-sensor means 110, the impressed magnetic fields of the individual sensor elements should be chosen correspondingly. This may, for example, be done as follows. The sensor element R1 and the sensor element R2 have a magnetic field of equal orientation, whereas the sensor elements R3 and R4 have a magnetic field shifted by 180°. Furthermore, the fifth sensor element 410 and the sixth sensor element 414, for example, comprise a magnetic field parallel or anti-parallel with respect to the first sensor element R1 and the second sensor element R2. If an external magnetic field, such as, for example, resulting by the periodically arranged, permanently magnetized areas of the pole wheel 310, acts on the field-sensor means 110, the resistance of the individual GMR elements changes depending on the angle between the externally acting magnetic field and the impressed magnetic field of the individual sensor elements. For example, if the external magnetic field 104 is arranged in parallel to the impressed magnetic field of the sensor element R1 and is at the same time anti-parallel to the impressed magnetic field of the sensor element R4, the resistance of the first element R1 is minimum and the resistance of the fourth element R4 maximum. Likewise, the resistance of the second element R2 is maximized (due to the anti-parallel orientation appearing there) and the resistance of the third element R3 minimized (due to the parallel orientation appearing there). This exactly corresponds to the case illustrated in the graph 430, i.e. the magnetic field 104 is rotated by 180° between the positions of the first and fourth sensor elements R1 and R4 and the positions of the second and third sensor elements R2 and R3.

The fifth and sixth sensor elements 410, 414 are spaced from the first and fourth sensor elements R1, R4, for example, by ¼ of the period of the periodic scale 102, and hence the magnetic field 104 has a rotation by 90°. Thus, the resistance of the fifth and sixth sensor elements 410, 414 is equal, and the signal d(x) has a minimum value. If the externally acting magnetic field 104 rotates by 90° due to a relative movement, the resistance of the fifth element and of the sixth element 410 and 414 becomes greater or smaller depending on the direction of rotation, and hence also the signal d(x), whereas the resistances of the first to fourth elements R1 to R4 adapt. A rotating, externally acting magnetic field 104 thus generates a change in the resistances of the individual sensor elements, and hence an oscillating sensor signal (for example of the voltage $u_1$ and $u_2$).

Below the field-sensor means 110, a chip layout 420 is shown, wherein the first and fourth sensor elements R1 and R4 are shown on the left side, the second and third sensor elements R3 and R2 on the right side, and the fifth (or sixth) sensor element 410 (or 414) is shown at the center, for example. The mean distance of the first and fourth sensor elements R1 and R4 on the one hand and of the third and second elements R3 and R2 on the other hand is given by d and corresponds to the mean distance of a north pole area 315 to a south pole area 320, or d designates the distance of the centers of adjacent north pole areas 315 and south pole areas 320.

In a diagram 430, a relative orientation (phase) of the magnetic field 104 with respect to the surface of the periodic scale 102 depending on the distance x is illustrated. At a center of a north pole area 315, the orientation of the magnetic field passes perpendicularly out of the north pole area 315, which corresponds to an angle of φ=0°. At a separation line 435 between the magnetic north pole area 315 and a magnetic south pole area 320, the magnetic field 104 passes in parallel to the surface of the exemplary pole wheel, which corresponds to an angle of 90°, i.e., φ=π/2. For a value of x lying within the magnetic south pole area 320, i.e., on the right side of the separation line 435, the magnetic field 104 is oriented toward the exemplary pole wheel, i.e., the angle φ>π/2. Finally, at the center of the magnetic south pole area 320, the magnetic field is oriented perpendicularly to the surface of the pole wheel 310. In contrast to the magnetic north pole area 315, the magnetic field in the magnetic south pole area is oriented toward the surface. Hence, the angle is φ=180°. The corresponding deflection of the magnetic field depending on the position x also is represented by the closed field lines 440.

Figure 4B:
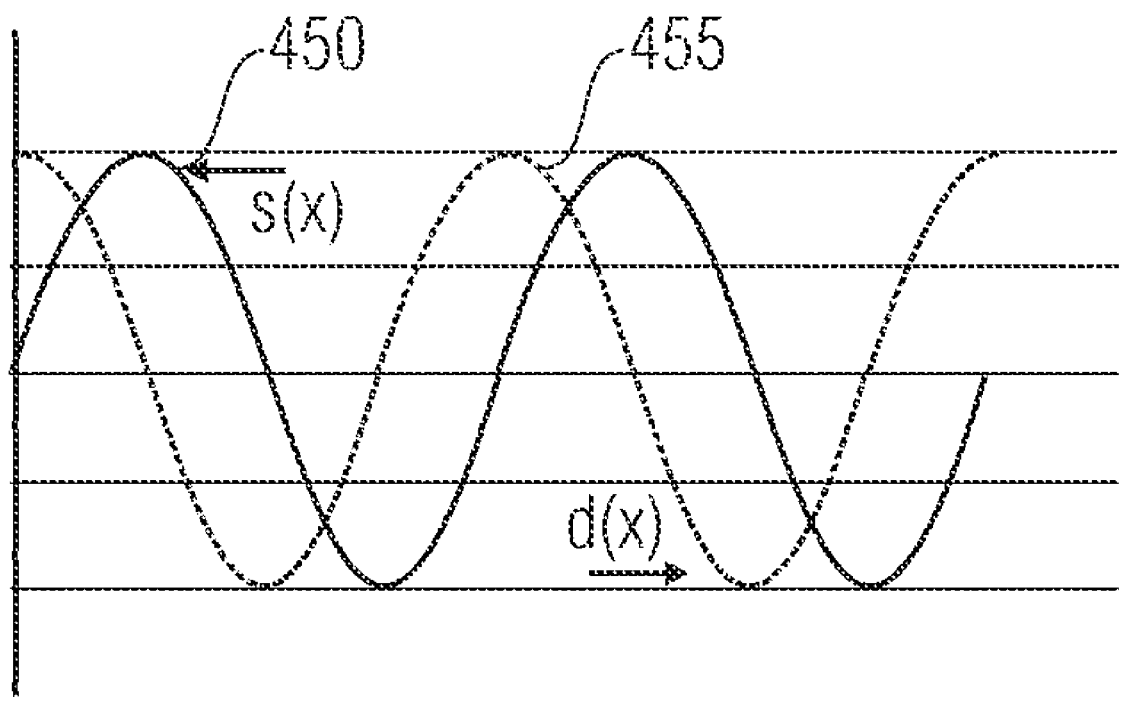
FIG. 4b is an illustration of a speed and direction signal depending on a rotation angle.

FIG. 4*b* shows a speed signal 450 s(x) and a direction signal d(x) 455. The speed signal 450 is generated by the bridge circuit of the elements R1, R2, R3 and R4, and the direction signal 455 by the fifth and sixth sensor elements 410 and 414.

Since the distance of the first and fourth sensor elements R1 and R4 to the third and second sensor elements R3 and R2 is d, and d is the mean distance of a south pole area 320 to a north pole area 315 (or distance of the corresponding centers), the right side of the bridge exhibits a phase rotation by 180° as compared with the left side of the bridge 210 for geometrical reasons. Furthermore, since the fifth sensor element 410 and the sixth sensor element 414 are arranged at the center, the corresponding sensor signal exhibits a phase rotation by 90° as compared with the first and fourth sensor elements R1 and R4. Assuming that a difference $s(x)=u_1-u_2$ is defined as the speed signal and d(x) as the direction signal, s(x) and d(x) will assume the following theoretical expressions:

$$\begin{cases} s(x) = K_S \cdot \sin(x) \\ d(x) = K_D \cdot \sin\left(x + \frac{\Pi}{2}\right) = K_D \cdot \cos(x) \end{cases} \quad (2)$$

The phase shift of the two signals can also be seen from the diagrams in FIG. 4*b*, where it was assumed that the amplitudes are equal, i.e., $K_S$ is equal to $K_D$.

Embodiments of the present invention are based on the following conditions or assumptions:

1. The speed signal s(x) is sinusoidal (i.e., uniformly arranged magnetized regions on the pole wheel or flywheel 310 and no irregular regions).

2. The direction signal d(x) is of pure cosine shape (no additional phase shift as compared with the speed signal s(x)).

3. The magnitude of the speed signal s(x) is equal to the magnitude of the direction signal d(x), i.e. $K_S=K_D$ (i.e., speed and direction signals have the same amplitude).

Hence:

$$\frac{\partial}{\partial x} s(x) = d(x) \quad (3)$$

This expression means that the derivation of the speed signal s(x) predicts or determines the direction signal d(x), which is taken advantage of in the embodiments according to FIGS. 1a-1c.

Figure 5A:
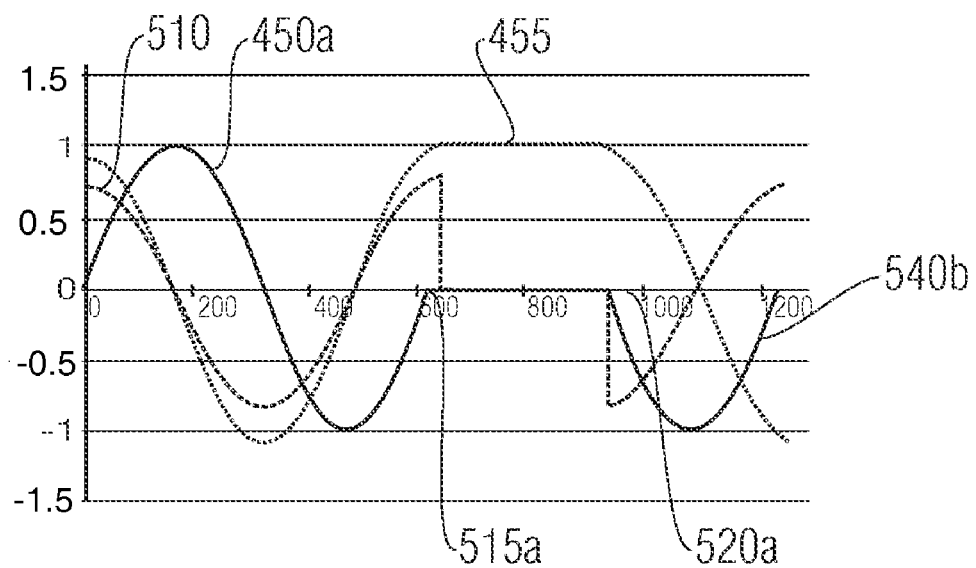
FIG. 5a shows waveform diagrams for a first rotational direction change.
Figure 5B:
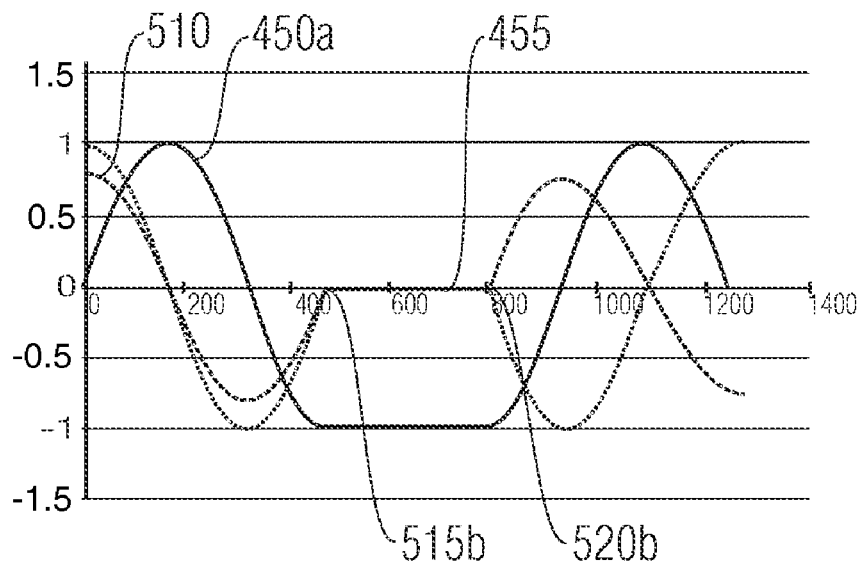
FIG. 5b shows waveform diagrams for a second rotational direction change.

FIGS. 5a and 5b shows two exemplary cases, which may occur assuming a change of direction and further include all possible change-of-direction events. Without limitation of the generality, reference will only be made to these two illustrated events in the following.

FIG. 5a shows three graphs for signals depending on the position x. The graph shows the speed signal s(x), the graph 455 shows the direction signal d(x), and a graph 510 shows a derivation with respect to the position x of the speed signal s(x) 450a. For better illustration, the graph 510 has been scaled, i.e., it has a slightly smaller amplitude than would be the case mathematically. The graph 450a, i.e. the speed signal s(x) passes periodically from x=0 to a first time 515a, wherein at the first time 515a the signal 450a again disappears, i.e., the voltage $u_1$ is equal to the voltage $u_2$. Since the value x represents the position of the field-sensor means 110 at a certain time above the exemplary pole wheel 310, a given value of x corresponds to a certain time. At the first time 515a in the graph from FIG. 5a, the exemplary pole wheel 310 comes to rest and continues the movement only at a time or at a value x corresponding to a value 520a, so that a second periodic signal 450b is generated, wherein the second periodic signal 450b starts with negative values for s(x). Since the first periodic signal 450a also stopped with negative values at the first time 515a, it follows that a reversion of movement has occurred (the voltage signal $u_2$ is greater than the voltage signal $u_1$ in both cases). On the other hand, the graph 450 for the direction signal d(x), which starts at a maximum value at x=0, also exhibits periodic behavior, which remains constant at a maximum value of d(x) equal to 1 from the first time 515a onward. This means that the field-sensor arrangement, during the rest phase between the first time 515a, is arranged as shown by the chip layout 420 in FIG. 4a, for example. At the time 520a, the signal d(x) again falls as a result of the continuation of the movement and transitions to periodic behavior. The derivation signal 510 exhibits a similar behavior between the point x=0 and the value at the first time 515a, but with the amplitude having been scaled. During the rest phase between the first time 515a and the second time 520a, however, the derivation signal falls back to the value of 0, since in this range the derivation of the speed signal s(x) disappears. From the time 520a onward, the derivation signal 510, however, passes opposite to the direction signal 455, i.e., the derivation signal 510 starts with a negative value at the time 510 and continues an oscillating movement. This jump to negative values of the derivation signal 510 is a result of the reversion of direction of the movement, i.e., the speed signal 450b is a falling function from the time 520a onward, in contrast to the speed signal, which ends at the first time 515a.

The speed signal s(x) 450a may correspond to the input signal of the differentiator 160 from FIG. 1b, and the derivation signal 510 to the output signal of the differentiator 160. The other input signal of the comparator 120 then, for example, corresponds to the direction signal d(x) 455.

FIG. 5b shows a graph representing a speed signal s(x), a graph 455 represented by a dotted line for a direction signal d(x) and again a derivation signal 510, which corresponds to a derivation of a speed signal 450a. The derivation signal 510 again is represented by a dashed line, and the speed signal 450 by a solid line. In this case, between the first time 515b and the second time 520b, there is again a rest phase, in which the field-sensor means 110 has no relative movement with respect to the exemplary pole wheel 310, but in this embodiment the rest phase is between the first time 515b and the second time 520b if the speed signal 450a has a negative maximum value, i.e., the voltage $u_1$ becomes minimal and the graph 455 also disappears, i.e., the direction signal d(x)=0. In contrast to the embodiment described in FIG. 5a, the derivation signal 510 in this embodiment continues its oscillating behavior after the second time 520b in the sense as it was interrupted at the first time 515b. But the direction signal 455 exhibits a reversion behavior between the behavior how it stops at the first time 515b and the behavior how it is continued at the second time 520b, i.e., it is interrupted as a rising signal behavior at the first time 515b and continues a falling behavior at the second time 520b. This means that the relative magnetic field orientation of the external magnetic field 104 in comparison with the impressed magnetic field from the fifth and sixth sensor elements 410 and 414 is from an anti-parallel orientation toward a perpendicular orientation before the first time 515b, and that the relative orientation of the magnetic field 104 in comparison with the impressed magnetic field again rotates toward an anti-parallel orientation from the second time 520b onward.

From FIG. 5a, it can thus be seen that the derivation signal 510 no longer follows the direction signal 455 for the quantity d(x) in the case shown. Occurrence of a discontinuity in the derivation signal 510, i.e., in the derivation of the speed signal s(x), hence is a clear mathematical indication for a reversion of direction. This discontinuity in s'(x) may also be represented by the following equation:

$$\left\| d(x) - \frac{\partial}{\partial x} s(x) \right\| = \tau(x) \quad \text{(Eq. 3)}$$

The difference, which is expressed by equation Eq. 3, hence may be taken as an indicator (trigger) for an occurrence of a change of direction. The corresponding graphical illustrations are shown in FIGS. 6a and 6b.

Figure 6A:
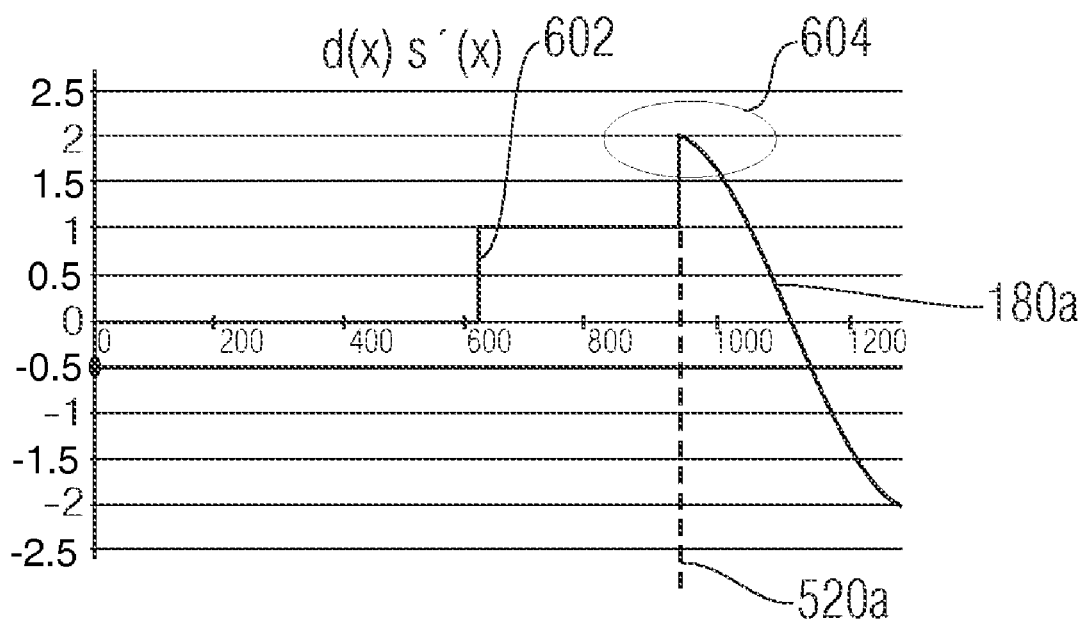
FIG. 6a is an indicator diagram for the first rotational direction change.

FIG. 6a shows a first reversion-of-direction signal 180a, which corresponds to the expression d(x)−s'(x). The first reversion-of-direction signal 180a here corresponds to the reversion-of-direction situation, as described in FIG. 5a, where the interruption arises at the first time 515a, and further a first jump 602 of the first reversion-of-direction signal 180a from the value of 0 to the value of 1. This jump is a consequence of the derivation signal 510 falling to the value of 0 at the first time 515a (beginning of the rest phase), with the direction signal 455 remaining at the value of 1. At the second time 520a (end of the rest phase), however, the derivation signal 510 jumps from a value of 0 to a negative value, and this again signals a second jump 604 from the value of 1 to the value of 2 in the first reversion-of-direction signal 180a. The value of 2 in the first reversion-of-direction signal 180a has been obtained under the assumption that the scaling, which was done in FIG. 5a and/or also in FIG. 5b (i.e., that the derivation signal 510 has a slightly decreased amplitude), has been cancelled again, so that the derivation signal 510 also has oscillating behavior between the values of +1 and −1. After the second time 520a, the first reversion-of-direction signal 180a exhibits oscillating behavior between the maximum values of +/−2. First-time appearance of a second jump 604 (=doubling of the amplitude) here signals a reversion of direction of the exemplary pole wheel 310 in comparison with the field-sensor arrangement 110. This threshold value excess can be determined by the threshold value comparator 174, wherein the threshold value may have a value greater 1 and smaller 2.

Figure 6B:
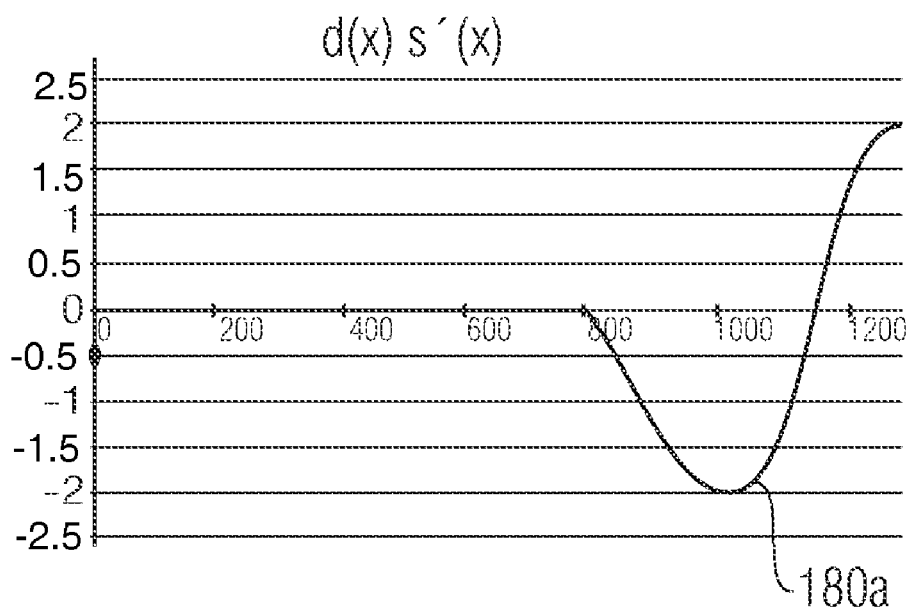
FIG. 6b is an indicator diagram for the second rotational direction change.

FIG. 6b shows the first reversion-of-direction signal 180a, which also represents the quantity d(x)−s'(x) and is obtained from the reversion-of-direction event, which was described in FIG. 5b. Here, it is also to be seen that the first reversion-of-direction signal 180a has the value of 0 in the one direction of movement, whereas it transitions to oscillating behavior upon the change of the direction of movement, oscillating between the values+/−2. This threshold value excess may again be determined by the threshold value comparator 174, wherein the threshold value may have a value greater 1 and smaller 2.

With reference to the phase angle in the graph 430, the measurement unit used in FIGS. 5A, 5B, 6a and 6b corresponds to 100 times a radian, i.e. 180° correspond to π times 100.

The hypotheses previously made are based on idealized assumptions. In the following, the three assumptions stated above will need to be analyzed with respect to the effect that influence deviations will have. In particular, the reliability of the proposed concept for determination of the reversion of direction is to be examined here.

At first, it is to be examined what influence deviations from the assumption that the speed signal s(x) is sinusoidal and the direction signal d(x) is of cosine shape will have. Although the influence of non-linearities in the function s(x) is to be examined in the following, it nevertheless is postulated that this function is 2π-periodic, which makes sense with respect to the physical properties (the pole wheel 310 rotates continuously). Thus, in the following:

$$s(x) \neq K_D \cdot \sin(x) = f(x) (\text{periodic of } 2\pi) \quad \text{(Eq. 4)}$$

This equation respects the condition of a Fourier series development, and hence:

$$f(x) = \sum_{n=0}^{\infty} a_n e^{jnx} = A + \sum_{n=1}^{\infty} [a_n \cos(nx) + b_n \sin(nx)] \quad \text{(Eq. 5)}$$

The function f(x) furthermore is assumed as an odd function of x, with the starting value f(0)=0 (DC value=0), which can be solved by the fact that $a_n|_1^\infty$ are identical to 0.

This again leads to the additional simplification of equation Eq. 5:

$$\begin{cases} f(x) = \sum_{n=2}^{\infty} b_n \sin(nx) = [b_1 \sin(x)] + \sum_{n=2}^{\infty} b_n \sin(nx) \\ b_n = \frac{1}{\Pi} \int_{-\infty}^{\infty} f(x) \cdot \sin(nx) \cdot dx \end{cases} \quad \text{(Eq. 6)}$$

The derivation of this equation again leads to:

$$\frac{\partial}{\partial x} f(x) = b_1 \cos(x) + \sum n \cdot b_n \cdot \cos(nx) \quad \text{(Eq. 7)}$$

It may now be concluded from equation Eq. 7 that, in spite of the assumed non-linearity, the derivation f'(x) still contains the prediction of the direction signal d(x) (which is given by a cos signal, for example).

In the same way, a non-linearity in the direction signal d(x) can be examined by an expansion of a general signal d(x) in a Fourier series, which again leads to an analog conclusion. After several transformations, it can be shown that:

$$g(x) - \frac{\partial}{\partial x} f(x) = (a_1 - b_1)\cos(x) + R(nx) n \in [2, \infty] \quad \text{(Eq. 8)}$$

It generally applies that, due to the physical implementation, the magnetic field 104 is homogeneous, and variations of the magnetic field therefore are sinusoidal, and the sensitivity curves for the speed and direction signal converter (i.e., the magnetoresistive elements) are relatively comparable to the process tolerance. This allows for the conclusion that the coefficients $a_1$ and $b_1$ are more or less similar, whereby the difference term from equation 8 lies very close to the ideal case. Presence of second-order effects, which are described by the remainder R(nx), does not have any influence on the validity of the conclusion previously obtained. Moreover, a solution reducing the influence of such non-linearities will be presented in the following.

In the following, it shall be examined what influence a deviation from the assumption that the amplitudes of the direction signal d(x) and of the speed signal s(x) match will have. To this end, it is assumed that s(x) and d(x) have different amplitudes, so that $K_S$ is unequal to $K_D$. Hence:

$$s'(x) = \frac{\partial}{\partial x} s(x) = K_S \cdot \cos(x) = \frac{K_S}{K_D} \cdot d(x) \quad \text{(Eq. 9)}$$

Calculation of the difference d(x)−s'(x) again shows $$\delta(x) = d(x) - s'(x) = d(x) - \frac{K_S}{K_D} \cdot d(x) = \left(1 - \frac{K_S}{K_D}\right) d(x) \quad \text{(Eq. 10)}$$

In the ideal case, if $K_S=K_D$ applies, equation Eq. 10 yields that δ(x)=0, as was to be expected. On the other hand, assuming that a parameter variation of about 30% is present in reasonable way, calculation of δ(x) yields:

$$\max\{\delta(x)\} \leftrightarrow \min\left\{\frac{K_S}{K_D}\right\} = \min\{K_S\} \cap \max\{K_D\} \quad \text{(Eq. 11)}$$

Further assuming that the parameters $K_D$ and $K_S$ belong to the same distribution, which has a mean value of $K_0$, and that also a maximum variation of +/−30% is present, one obtains the following:

$$\begin{cases} \max\{K_D\} = K_0 \cdot 1.3 \\ \min\{K_S\} = K_0 \cdot 0.7 \end{cases} \Rightarrow \min\left\{\frac{K_S}{K_D}\right\} \cong 0.5 \quad \text{(Eq. 12)}$$

and with Eq. 10, the following applies $$\max\{\delta(x)\} \cong \frac{d(x)}{2} \quad \text{(Eq. 13)}$$

Analogously, the calculation of the minimum of d(x), (i.e., min{d(x)}) may take place, so that the function d(x) can be limited as follows (taking the 30% maximum variation into account):

$$-0.85 \cdot d(x) \leq \delta(x) \leq 0.5 \cdot d(x) \Rightarrow -1.105 \leq \delta(x) \leq 0.65 \quad \text{(Eq. 14)}$$

Since this result is unacceptable, the single reasonable solution is to ensure that the signals s(x) and d(x) or quantities transformed correspondingly have the same amplitude.

Figure 7:
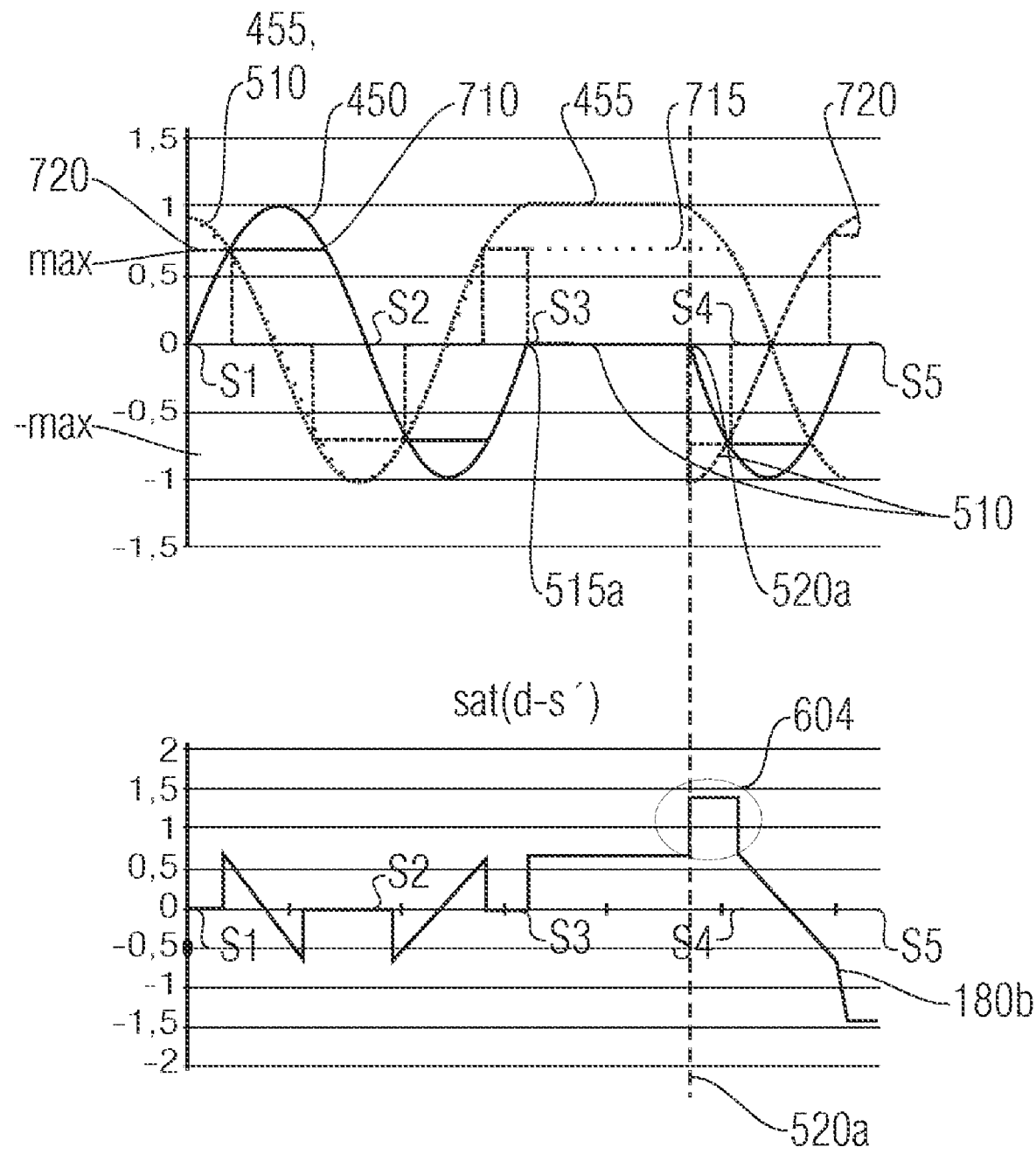
FIG. 7 shows signal and saturation diagrams (top) and a corresponding rotational direction reversion signal (bottom) for the first rotational direction change.

FIG. 7 shows an embodiment of the present invention which corresponds to a signal waveform as already illustrated in FIG. 5a. The speed signal 450 is indicated by a thin continuous line, the direction signal 455 is indicated by a thin dotted line, a saturated speed signal 710 is indicated by a thick continuous line, a saturated direction signal 715 is indicated by a thick dotted line and a saturated derivation signal 720 is indicated by a broken line. The saturated speed signal 710 and the saturated direction signal 715 can be obtained from the speed signal 450 and the direction signal 455, a maximally allowed amplitude forming maximum positive and negative values, +/−max, for the two signals. In the embodiment described in FIG. 7, this maximum value exemplarily is max≈0.7 and exceeding the threshold value again can be established by the threshold value comparator 174, wherein now the threshold value may comprise an absolute value greater than max and smaller than 2max.

The saturated derivation signal 720 is obtained by differentiating the saturated speed signal 710 for the value x and/or time and is indicated in FIG. 7 by a broken line. Since the saturated speed signal 710 is limited by the maximum value max, the saturated derivation signal 720 comprises a stepped shape and vanishes or exhibits the negative maximum value, i.e., −max. There is no relative movement between the field-sensor means 110 and the exemplary pole wheel 310 between the first time 515a and the second time 520a like in the embodiment of FIG. 5a so that the speed signal 450 and the saturated speed signal 710 vanish in this region and the direction signal 455 and the saturated direction signal 715 remain constant.

A second reversion-of-direction signal 180b formed by the difference between the saturated direction signal 715 and the saturated derivation signal 720 is shown in the lower illustration in FIG. 7. Up to the second time 520a when movement in the reversed direction begins, the second reversion-of-direction signal 180b has a variation width between the positive and negative maximum values+/−max and the reversion of movement is, like in FIG. 6a, also signaled by doubling the variation width, i.e., the following signal after the second time 520a (vertical line) has a variation width between double the value of the maximum signal max. The second jump 604 to double the amplitude again characterizes a reversion of movement.

Figure 8:
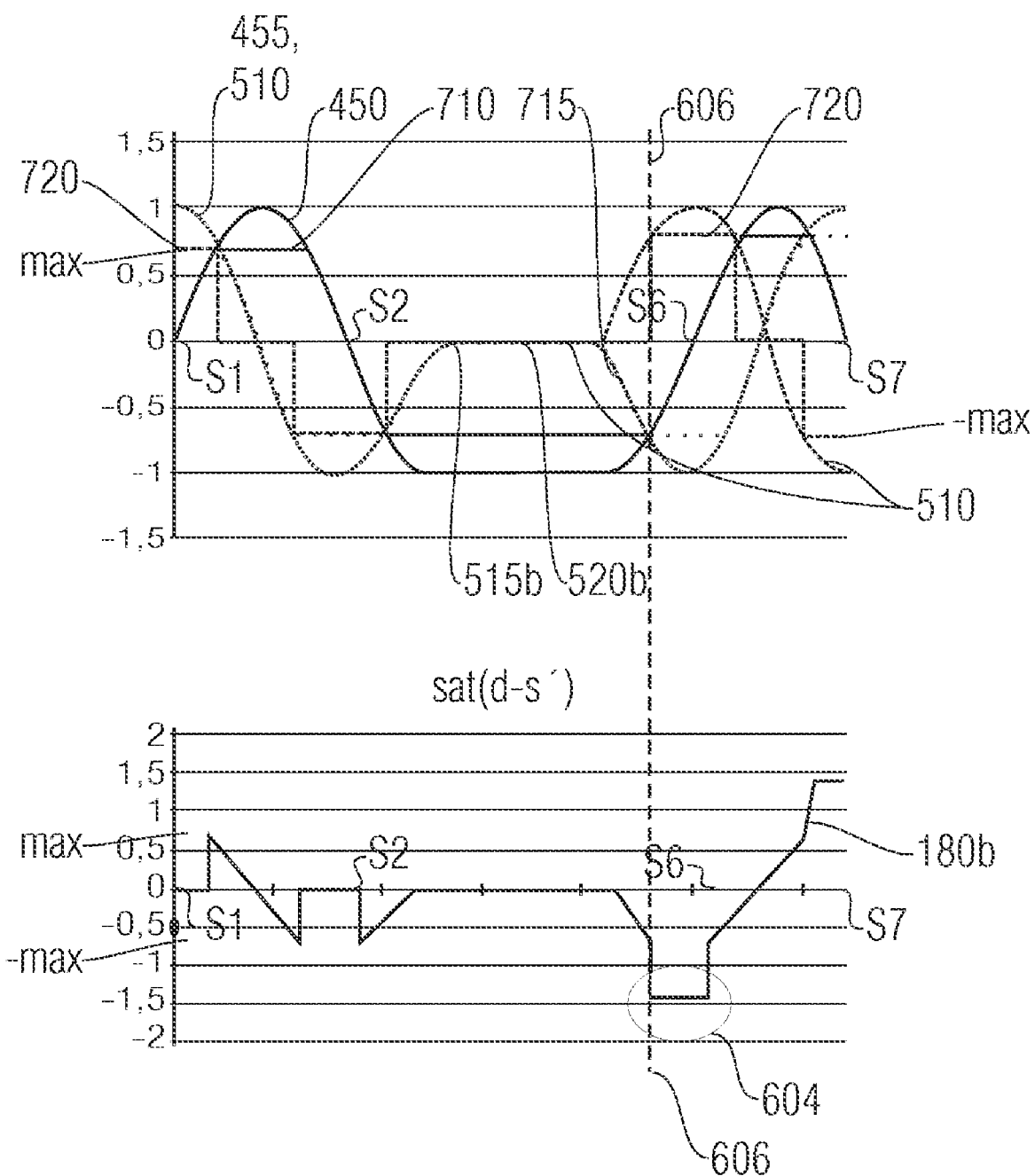
FIG. 8 shows signal and saturation diagrams (top) and a corresponding rotational direction reversion signal (bottom) for the second rotational direction change.

FIG. 8, top, shows the analog situation, as has been described in FIG. 7, but for a signal waveform corresponding to that of FIG. 5b. Again, the speed signal 450 is indicated by a thin continuous line, the saturated speed signal 710 is indicated by a thick continuous line, the direction signal 455 is indicated by a dotted line, the saturated direction signal 715 is indicated by a thick dotted line and the saturated derivation signal 720 is indicated by a broken line. In contrast to the embodiment of FIG. 7, in this embodiment the relative movement is interrupted at the first time 515b and the movement is resumed with reversed direction at the second time 520b. As is shown in the embodiment of FIG. 5b, the reversion of direction takes place at a time when the speed signal 450 has a maximum negative value and the direction signal 455 and/or the saturated direction signal 715 has an infinitesimal value.

The lower part of FIG. 8 shows the corresponding second reversion-of-direction signal 180b which corresponds to a difference of the saturated direction signal 715 and the saturated derivation signal 720. Like in the embodiment of FIG. 7, too, the second reversion-of-direction signal 180b has a variation width between the positive and negative values max and the reversion of movement at the second time 520b is signaled by doubling the variation width of the second reversion-of-direction signal 180b. The first time double the variation width occurs is characterized by the second jump 604 (illustrated in FIG. 8 as a vertical line). The variation width of the second reversion-of-direction signal 180b is continued after the second time 520 until there is another reversion of direction after the variation width has halved, i.e., it varies again between the positive and negative maximum values max. This change can be established by the threshold value comparator 174, wherein again the threshold value may have an absolute value greater than max and smaller than 2max.

The second reversion-of-direction signal 180b as is illustrated in the embodiments of FIGS. 7 and 8 thus necessitates so-called pre-processing of the signals s(x) and d(x) in a manner such that both quantities are able to take a maximally allowed amplitude max (like in a saturation mode). As can be seen from FIGS. 7 and 8, the derivation s'(x) saturates a positive or negative maximum value (so-called high or low, i.e., +/−max), when the quantity d(x) takes an equal value as long as there is no reversion of movement and thus change in phase. On the other hand, with a reversion of movement, the signals s'(x) and d(x) saturate opposite values, which can be interpreted as a "warning" for the result sought, i.e., a reversion of movement. The existence of opposite maximum values also shows, when calculating the difference, in double an amplitude which only occurs in one direction of movement, whereas in the other direction of movement a variation is within the normal amplitude.

Figure 9:
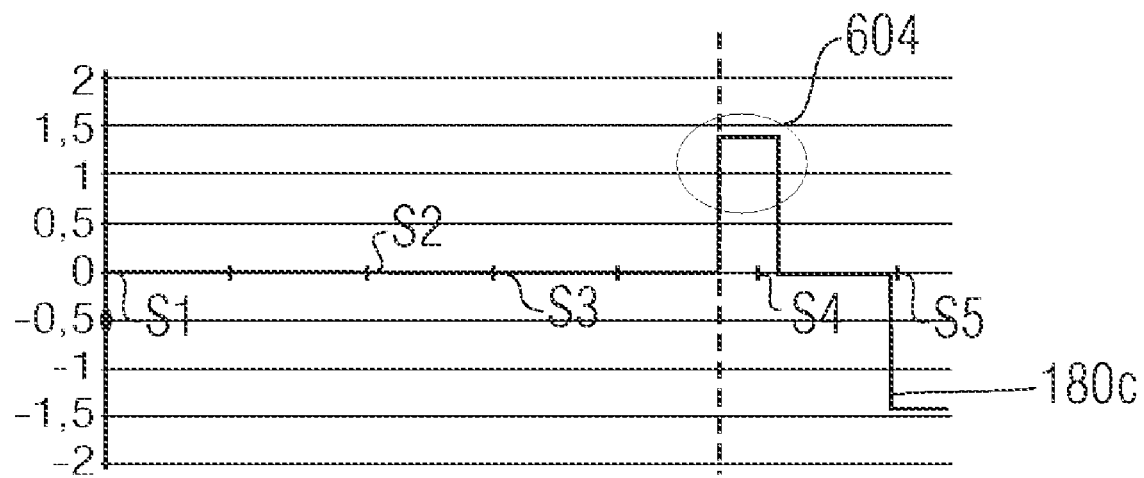
FIG. 9 shows signal and saturation diagrams for the first rotational direction change (top) and a rotational direction reversion signal generated by sampling (bottom)
Figure 10:
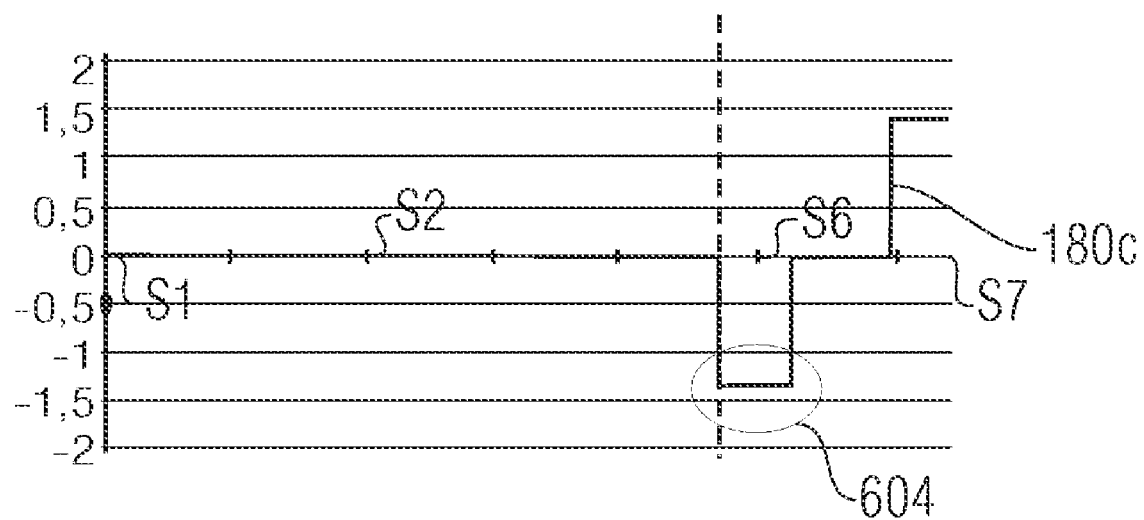
FIG. 10 shows signal and saturation diagrams for the second rotational direction change (top) and a rotational direction reversion signal generated by sampling (bottom)

In FIGS. 9 and 10, another embodiment of the present invention is shown again referring to the signal sequence as has been shown in FIGS. 5a and 5b. FIG. 9 here again refers to the signal sequence of FIG. 5a. In contrast to the embodiment of FIG. 7 where the second reversion-of-direction signal 180b, i.e., the difference between the saturated direction signal 715 and the saturated derivation signal 720, has been used, in the embodiment of FIG. 9, sampling takes place at discrete times. At the bottom of FIG. 9, a sample signal which corresponds to the difference of the direction signal 455 and the derivation signal 510 has been taken as the third reversion-of-direction signal 180c. Sampling thus exemplarily takes place at the time when the derivation signal 510 takes maximum and/or minimum values (and/or when the speed signal 450 has zeros), which will be the case at the time $s_1$ (maximum value), $s_2$ (minimum value), $s_3$ (maximum value), $s_4$ (maximum value) and $s_5$ (minimum value). Up to the time $s_3$, the direction signal 455 and the derivation signal 510 have identical forms. It shows that the third reversion-of-direction signal 180c vanishes due to sampling in a direction of movement, no sampling takes place during the rest phase and, at the time of reversion of direction, i.e., at the time 520a, characterized by a vertical line in FIG. 9, the third reversion-of-direction signal 180c jumps from the zero value to a maximum value which in this embodiment is roughly 1.4, and, at the next sampling at the time $s_5$, the third reversion-of-direction signal 180c has a negative maximum value. The first time the third reversion-of-direction signal 180c occurs is again characterized by the jump 604 and signals a reversion of direction of the movement.

FIG. 10 shows the same procedure for the scenario and signals as described in FIG. 5b. Like in the embodiment described in FIG. 9, sampling has also taken place and a third reversion-of-direction signal 180c is formed of a difference signal of the direction signal 455 and the derivation signal 510 after sampling has taken place. Sampling again is performed at times when the derivation signal 455 is maximum and/or minimum (and/or when the speed signal 450 has zeros), i.e., at times $s_1$ and $s_2$, which are identical to the times described in FIG. 9. Additionally, sampling takes place at the time $s_6$ where the speed signal 450 and the derivation signal 510 have a maximum value. Additionally, sampling takes place at the time $s_7$ where the derivation signal 510 has a negative maximum value. Like in the embodiment described in FIG. 9, the third reversion-of-direction signal 180c has only discrete values. Up to the reversion of direction at the time 520b, the value is zero and, after the second time 520b, the third reversion-of-direction signal 180c exhibits a negative maximum value which in the example chosen here is roughly −1.4, and has a positive maximum value of roughly 1.4 in a subsequent sampling at the time $s_7$. At later times, the third reversion-of-direction signal 180c will continue to vary between the positive and negative maximum values until the direction is reverses again after which the third reversion-of-direction signal 180c will vanish again. A reversion of direction is, like in the embodiment of FIG. 9, signaled by the first time the third reversion-of-direction signal 180c is deflected 604. The fact that the third reversion-of-direction signal 180c for the first time has a negative value is due to the example and/or signal chosen and may differ in signals selected to be different.

The samplings shown in FIGS. 9 and 10 can be performed by the sampler 172, wherein the times $s_1$ to $s_7$ correspond to zero crossings of the speed signal 450 which can be established by the zero crossing detector 178, or extreme values of the derivation signal 510 which can be established by the extreme value detector 176. A decision on a reversion of direction is made in analogy to the embodiments of FIGS. 7 and 8, wherein the threshold value decision can again be made by the threshold value comparator 174.

A characteristic of the embodiments described in FIGS. 9 and 10 has been that a reversion-of-direction event has shown by doubling of the value of d(x)−s'(x) when the maximum of s'(x), i.e., max{s'(x)} (and/or a minimum of s'(x) or min{s'(x)}) is used as a trigger signal for sampling the signal d(x)−s'(x). A reversion of direction could exemplarily be established by means of a threshold value comparator, wherein the threshold value comparator compares the reversion-of-direction signal 180 to a threshold value and the threshold value is between maximum values of the reversion-of-direction signal 180 for the different directions of movement.

When making a decision for a reversion of direction, the sign of the difference of d(x)−s'(x) (i.e., sign {d(x)−s'(x)}) is not important, as may be deduced from the figures. Actually, a reversion-of-direction event may also take place in a completely symmetrical situation, i.e. in a situation which is not described in FIGS. 8 to 10. In order to be able to process the direction signal 455 d(x) (i.e., a direction pulse D(T) or an output of the corresponding apparatus) correctly, a zero crossing must be established in order to be compatible with an actual design or actual implementation of the facility (and/or customer requirements). When there is a zero crossing and establishing the direction signal 455 d(x) is in a valid mode, an internal state machine (like, for example, the state machine 228) is to decide whether an output signal returns a match with the states existing before. After a decision of a change in direction has been made, the internal direction state is to be changed into the corresponding opposite state and the output pulse logic is to generate a pulse comprising an opposite edge.

The expenditure for implementing the above embodiments is largely caused by the means calculating the derivation. This derivative unit is to be DC-stable and relatively resistant with regard to high-frequency noise. Additionally, the bandwidth may cause problems with regard to the requirements of the desired application. For automobile applications, for example, a low frequency of considerably less than 100 Hertz is typical (typically smaller than 50 Hertz). This frequency range is very similar to biomedical applications where signals, as per definition, occur in the ultra-low frequency (ULF) range. According to embodiments of the present invention, using a switched capacitor (SC) circuit is of an advantage which, in connection with a relatively low current and/or voltage consumption, is of particular advantage in that a so-called intrinsic adjusting robustness can be achieved. The transfer function H(s) can truly be expressed by a ratio of capacitances and is thus process-independent and/or insensitive towards process variations, for example, of the layer thickness.

The bandwidth limitation can be solved by using SC differentiators. On the other hand, these classes of circuits, however, have their own undesired effects. Exemplarily, DC amplification is a linear function of frequency, as can be expressed by the following equation:

$$H_{DER}(j\omega) \cong j\omega \cdot \frac{C_1}{C_2} \cdot T_{clk} \quad \text{(Eq. 15)}$$

In order to bypass the limitations described before, a so-called pre-process is to alter the input signal with regard to amplitude by a function linearly increasing by 1/ω. This may exemplarily be done by using an SC integrator the transfer function of which meets the following relation:

$$H_{INT}(j\omega) \cong \left[j\omega \cdot \frac{C_1}{C_2} \cdot T_{clk}\right]^{-1} \quad \text{(Eq. 16)}$$

Thus, the following applies:

$$S_{INT}(\omega t) = L^{-1}[H_{INT}(s) \cdot S(s)] \quad \text{(Eq. 17)}$$
$$= \frac{K_S}{\omega \cdot \left(\frac{C_1}{C_2}\right) \cdot T_{clk}} \cdot \cos(\omega t)$$

Figure 11:
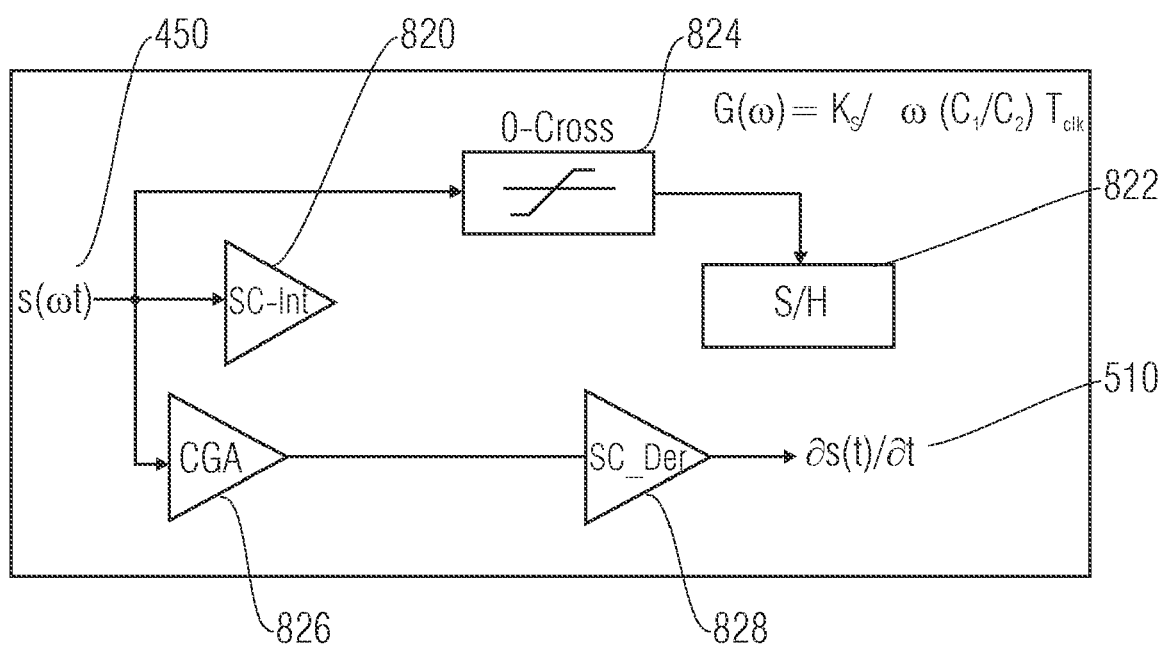
FIG. 11 is a principle illustration for an amplitude correction and/or an extraction principle.

FIG. 11 shows comparing means or a differentiator taking up and using these relations. It can be used in FIGS. 1a-1c. An input signal which exemplarily is the speed signal 450 is guided to an SC integrator 820. An output signal of the SC integrator 820 is guided to means for sampling and holding 822 (a so-called sample-and-hold device). The means for sampling and holding 822 is controlled by means for establishing a zero crossing 824 and the means for establishing a zero crossing 824 receives the exemplarily speed signal 450 as an input signal. An output signal of the means for sampling and holding 822 controls a controllable gain amplifier (CGA) 826. An input signal of the controllable gain amplifier 826 in turn is the exemplarily speed signal 450 and an output signal of the controllable gain amplifier 826 is passed on to an SC derivative unit or differentiator 828 the output signal of which represents the derivation signal 510 at a certain time t.

The AC component of the signal of equation Eq. 17 reaches maximum values each time when the speed signal s(ωt) or s(x) passes a zero crossing. The embodiment shown in FIG. 11 consequently is of advantage in that it considers this fact and performs frequency correction of the amplitude G(ω) and/or produces a frequency-corrected amplitude. Using a controllable gain amplifier which is changed by the frequency-corrected amplitude, what is obtained finally is complete amplitude compensation with regard to frequency as is shown in the embodiment of FIG. 11. It is to be pointed out that by using a controllable gain amplifier controlled by an amplitude $G(\omega)$ a type of complete amplitude-frequency compensation is achieved.

Embodiments of the present invention make use of GMR sensors elements for detecting the magnetic field 104. In further embodiments, TMR (tunnel magneto resistance), AMR (anisotropic magneto resistance), CMR (colossal magneto resistance) sensor elements, for example, may also be used. In further embodiments, the field-sensor means 110 comprises Hall sensors for detecting the magnetic field 104 defined or generated and/or changed by the periodic scale 102.

Amplitude compensation and/or compensation with regard to frequency is of particular advantage for embodiments of the present invention and can be achieved as described before. The solution indicated exhibits a number of advantages compared to conventional means for establishing a reversion of direction. These are, among other things, the fact that no analog-to-digital converter is necessary and calculating a reversion of direction as necessary and/or obtaining corresponding information can be achieved on the smallest space of a corresponding integrated circuit, and thus a significant amount of area can be saved, for example, on a silicon wafer. An intrinsic frequency dependence and/or amplification or attenuation of a signal in dependence on frequency reduces contributions of low-frequency vibration modes. A reversion of direction can be established immediately at the time it takes place. This means that establishing the reversion of direction takes place asynchronously to the system clock, wherein this in particular allows a very fast response time and is thus compatible with high-speed applications. Apart from that, embodiments of the present invention do not suffer from a calibration delay in a starting phase as long as the signal frequency is within a suitable range (i.e. sufficient mechanical acceleration). Thus, embodiments of the present invention are of particular advantage compared to conventional means which are based on fully digital process processing. If the frequency-dependent amplitude amplification is not analyzed correctly and considered for a certain application and/or compensated, this may cause a problem with regard to the signal-to-noise ratio.

Further changes in the above embodiments can be made. Exemplarily, they are not limited to magnetic fields. Different physical or energetic fields may also be used. Furthermore, according to the above embodiments, the GMR sensors have been arranged such that the speed and direction signals have been obtained by measuring the same field component and direction, respectively, for which the sensors have been suitably spaced apart from each other. This is of advantage in that pre-magnetization of GMRs can be performed in manufacturing by means of a homogenous field, however, this is not absolutely necessary. Rather, the GMR sensors for d and could also detect different components and exemplarily be arranged at the same location and/or directly next to one another, like, for example, the x and z components in FIG. 3b. There is also an inherent phase shift between d and s. With regard to the pole wheel described before, it is to be mentioned that the above embodiments are not limited to rotational movements. A straight scale including linear relative movement to the sensor assembly, illustrated simplistically in FIG. 3b, is also possible. In addition, the pole wheel may also be replaced by a simple bar magnet or the like, for although this scale only has one period, it defines a periodically changing field with rotational movement. The differentiator and/or comparator described before may also be implemented in a different manner.

Depending on the circumstances, the above embodiments may be implemented in either hardware or software. The implementation may be on a digital storage medium, in particular on a disk, CD or DVD having control signals which can be read out electronically which can cooperate with a programmable computer system such that the respective method will be executed. In general, the invention also is in a software program product and/or a computer program product and/or a program product comprising program code stored on a machine-readable carrier for performing the inventive method when the software program product runs on a computer or processor. In other words, the invention may also be realized as a computer program and/or software program and/or program comprising a program code for performing the method when the program runs on a processor. The processor here may be a computer, a chip card (smart card) or another integrated circuit.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for detecting a reversion of direction of a relative movement between a periodic scale for defining a periodic field and field-sensor for outputting first and second sensor signals upon the periodic field defined by the periodic scale such that, in a first direction of movement of the relative movement, the first sensor signal is advanced from the second sensor signal and, in a second direction of movement of the relative movement, the second sensor signal is advanced from the first sensor signal, comprising:
    means for determining a difference between one of the first sensor signal and the second sensor signal on the one hand and a signal corresponding to a temporal change of the other one of the first sensor signal and the second sensor signal on the other hand; and
    means for detecting the reversion of direction of the relative movement dependent on the difference determined.

2. The apparatus of claim 1, wherein the means for detecting the reversion of direction of the relative movement comprises means for sampling the difference at discrete times when the other one of the first and second sensor signals comprises a zero crossing.

3. The apparatus of claim 1, wherein the means for detecting the reversion of direction of the relative movement comprises means for sampling the difference at discrete times when the signal comprises an extremum.

4. The apparatus of claim 1, wherein the means for detecting comprises a threshold value comparator for checking whether the difference leaves a predetermined range of values to infer an occurrence of the reversion of direction in this case.

5. The apparatus of claim 1, wherein the apparatus also comprises the periodic scale and the field-sensor, wherein the output of the field-sensor in the relative movement comprises the result that the first sensor signal and the second sensor signal are basically sinusoidal and phase-shifted to each other by 90 degrees.

6. The apparatus of claim 1, further including, as periodic scale, an indicator object defining the periodic field, the field-sensor comprising a first field sensor for outputting the first sensor signal and a second field sensor for outputting the second sensor signal, and the first and second field sensors comprising a spacing of (4n−3)/(4n) of a period length of the periodic field, with n being a natural number, and being arranged to be sensitive to an equal field component of the periodic field.

7. The apparatus of claim 6, wherein the first or second magnetic field sensor is part of a Wheatstone-like bridge.

8. The apparatus of claim 6, wherein the first and/or second field sensors comprise a GMR sensor.

9. The apparatus of claim 1, wherein the means for determining comprises a differentiator for differentiating the other one of the first sensor signal and the second sensor signal relative to the signal.

10. The apparatus of claim 9, wherein the differentiator comprises a differentiating stage and an integrating stage which are coupled to each other such that a non-linearity of a transfer function of the differentiator is reduced compared to a non-linearity of a transfer function of the differentiating stage.

11. A reversion-of-movement sensor, comprising:
a first sensor signal input;
a second sensor signal input;
a comparator comprising a first input and a second input;
a differentiator coupled between the first input of the comparator and the first sensor signal input or the second sensor signal input, the second input of the comparator being coupled to the other one of the first sensor signal input or the second sensor signal input; and
a processor coupled to an output of the comparator and comprising an output for a reversion-of-direction signal.

12. The reversion-of-movement sensor of claim 11, wherein the processor comprises a sampler coupled between the output of the comparator and the output for the reversion-of-direction signal and comprising a sample time default input, and a zero crossing detector comprising an input coupled to the one of the first and second sensor signal inputs and an output coupled to the sample time default input.

13. The reversion-of-movement sensor of claim 11, wherein the processor comprises a sampler coupled between the output of the comparator and the output for the reversion-of-direction signal and comprising a sample time default input, and an extreme value detector comprising an input coupled to an output of the differentiator and an output coupled to the sample time default input.

14. The reversion-of-movement sensor of claim 11, wherein the processor comprises a threshold value comparator comprising an input and an output by which the threshold value comparator is coupled between the output of the comparator and the output for the reversion-of-direction signal.

15. The reversion-of-movement sensor of claim 11, further comprising a first field sensor coupled to the first sensor signal input and a second field sensor coupled to the second sensor signal input.

16. The reversion-of-movement sensor of claim 15, further including an indicator object defining a periodic field, the first and second field sensors comprising a spacing of (4n−3)/(4n) of a period length of the periodic field, with n being a natural number, and being arranged to be sensitive to an equal field component.

17. The reversion-of-movement sensor of claim 15, wherein the first or second field sensor is part of a Wheatstone-like bridge.

18. The reversion-of-movement sensor of claim 16, wherein the first and/or second field sensor comprise a GMR sensor.

19. The reversion-of-movement sensor of claim 11, wherein the differentiator comprises a differentiating stage and an integrating stage that are coupled to each other such that a non-linearity of a transfer function of the differentiator is reduced compared to a non-linearity of a transfer function of the differentiating stage.

20. A reversion-of-movement sensor comprising:
a periodic scale defining a periodic field;
a first sensor signal input and a second sensor signal input;
a field-sensor arrangement responding to the periodic field with a first sensor signal at the first sensor signal input and a second sensor signal at the second sensor signal input such that, in a first direction of movement of a relative movement between the periodic scale and the field sensor arrangement, the first sensor signal is advanced from the second sensor signal and, in a second direction of movement of the relative movement between the periodic scale and the field sensor arrangement, the second sensor signal is advanced from the first sensor signal;
a comparator comprising a first input and a second input;
a differentiator coupled between the first input of the comparator on the one hand and one of the first sensor signal input and the second sensor signal input on the other hand, the second input of the comparator being coupled to the other one of the first sensor signal input and the second sensor signal input; and
a processor coupled to an output of the comparator and comprising an output for a reversion-of-direction signal.

21. The reversion-of-movement sensor of claim 20, wherein the processor comprises a threshold value comparator comprising an input and an output by which the threshold value comparator is coupled between the output of the comparator and the output for the reversion-of-direction signal.

22. The reversion-of-movement sensor of claim 20, wherein the processor comprises a sampler coupled between the output of the comparator and the output for the reversion-of-direction signal and comprising a sample time default input, and a zero crossing detector comprising an input coupled to the one of the first and second sensor signal inputs and an output coupled to the sample time default input.

23. The reversion-of-movement sensor of claim 20, wherein the processor comprises a sampler coupled between the output of the comparator and the output for the reversion-of-direction signal and comprising a sample time default input, and an extreme value detector comprising an input coupled to an output of the differentiator and an output coupled to the sample time default input.

24. A method of detecting a reversion of direction of a relative movement between a periodic scale for defining a periodic field and a field sensor, the method comprising:
outputting first and second sensor signals upon the periodic field defined by the periodic scale such that, in a first direction of movement of the relative movement, the first sensor signal is advanced from the second sensor signal and, in a second direction of movement of the relative movement, the second sensor signal is advanced from the first sensor signal;
determining a difference between one of the first sensor signal and the second sensor signal on the one hand and a signal corresponding to a temporal change of the other one of the first sensor signal and the second sensor signal on the other hand; and
detecting a reversion of direction of the relative movement dependent on a certain the difference determined.

25. The method of claim 24, wherein detecting the reversion of direction of the relative movement comprises sampling the difference at discrete times when the other one of the first and second sensor signals comprises a zero crossing.

26. The method of claim 24, wherein detecting the reversion of direction of the relative movement comprises sampling the difference at discrete times when the signal comprises an extremum.

27. The method of claim 24, wherein detecting comprises a threshold value comparison for checking whether the difference leaves a predetermined range of values to infer the occurrence of the reversion of direction in this case.

28. The method of claim 24, wherein determining comprises differentiating the other one of the first sensor signal and the second sensor signal relative to the signal.

29. The method of claim 28, wherein differentiating comprises a differentiating substep and an integrating substep such that a non-linearity of a transfer function of the differentiating step is reduced relative to a non-linearity of a transfer function of the differentiating substep.

30. A computer program product having a program stored on a non-transitory computer readable medium comprising a program code for performing a method of detecting a reversion of direction of a relative movement between a periodic scale for defining a periodic field and a field sensor, comprising: outputting first and second sensor signals upon the periodic field defined by the periodic scale such that, in a first direction of movement of the relative movement, the first sensor signal is advanced from the second sensor signal and, in a second direction of movement of the relative movement, the second sensor signal is advanced from the first sensor signal; determining a difference between one of the first sensor signal and the second sensor signal on the one hand and a signal corresponding to a temporal change of the other one of the first sensor signal and the second sensor signal on the other hand; and detecting the reversion of direction of the relative movement dependent on the certain difference determined, when the program runs on a processor.

31. The apparatus according to claim 1, wherein the signal corresponding to the temporal change of the other one of the first sensor signal and the second sensor signal, is equal to a temporal derivative of the other one of the first sensor signal and the second sensor signal.

\* \* \* \* \*